US008855815B2

(12) United States Patent
Mizutani

(10) Patent No.: US 8,855,815 B2
(45) Date of Patent: Oct. 7, 2014

(54) MOTION PATH SEARCH DEVICE AND METHOD OF SEARCHING FOR MOTION PATH

(75) Inventor: Kenji Mizutani, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/453,522

(22) Filed: Apr. 23, 2012

(65) Prior Publication Data

US 2012/0209428 A1    Aug. 16, 2012

Related U.S. Application Data

(63) Continuation of application No. PCT/JP2011/004100, filed on Jul. 20, 2011.

(30) Foreign Application Priority Data

Jul. 27, 2010    (JP) .................................. 2010-168660

(51) Int. Cl.
G06F 19/00    (2011.01)
G05B 19/423    (2006.01)

(52) U.S. Cl.
CPC .................................... *G05B 19/423* (2013.01)
USPC ........... 700/245; 700/250; 700/264; 318/560; 318/568.11; 318/568.13; 318/568.14; 318/568.16; 318/568.19; 318/568.2

(58) Field of Classification Search
USPC ............. 700/245, 250, 264; 318/560, 568.11, 318/568.13, 568.14, 568.16, 568.17, 318/568.19, 568.2; 382/153
See application file for complete search history.

(56) References Cited

U.S. PATENT DOCUMENTS 4,888,707 A    12/1989    Shimada
5,542,036 A *  7/1996    Schroeder et al. ............ 345/424

(Continued)

FOREIGN PATENT DOCUMENTS

CN    1507384 A     6/2004
CN    101063986 A   10/2007
CN    101770235 A   7/2010

OTHER PUBLICATIONS

Maeda et al., Easy robot programming for industrial manipulators by manual volume sweeping, 2008 IEEE International Conference on Robotics and Automation, Pasadena, CA, USA, May 19-23, 2008, pp. 2234-2239.*

(Continued)

*Primary Examiner* — Khoi Tran
*Assistant Examiner* — Jaime Figueroa
(74) *Attorney, Agent, or Firm* — Wenderoth, Lind & Ponack, L.L.P.

(57) ABSTRACT

A motion path search device which searches for a motion path of a movable part of a robot capable of being taught a motion by direct teaching in which the robot is directly moved by an operator includes: a first space identification unit which identifies a space swept through by the movable part of the robot in the direct teaching; a second space identification unit which identifies a space swept through by at least a portion of a body of the operator in the direct teaching; a space combining unit which calculates, as an accessible space, a union of the space identified by the first space identification unit and the space identified by the second space identification unit; and a path search unit which searches for a motion path of the movable part within the accessible space calculated by the space combining unit.

8 Claims, 31 Drawing Sheets

(56) References Cited

U.S. PATENT DOCUMENTS

| | | | |
|---|---|---|---|
| 6,099,573 | A | 8/2000 | Xavier |
| 7,110,859 | B2 | 9/2006 | Shibata et al. |
| 7,996,197 | B1 * | 8/2011 | Xavier .............................. 703/7 |
| 8,095,200 | B2 * | 1/2012 | Quaid, III ..................... 600/407 |
| 8,185,265 | B2 | 5/2012 | Nagano |
| 2004/0138779 | A1 | 7/2004 | Shibata et al. |
| 2007/0278426 | A1 | 12/2007 | Tanaka |
| 2010/0168950 | A1 | 7/2010 | Nagano |

OTHER PUBLICATIONS

Maeda et al., Easy robot programming for industrial manipulators by manual volume sweeping, 2008, Maeda Lab, Dept. of Mech. Eng., Yokohama National University, http://www.iir.me.ynu.ac.jp/.*

Hasegawa et al., Collision-free path planning of a telerobotic manipulator based on swept volume of teleoperated manipulator, Proceedings of the 5$^{th}$ IEEE International Symposium on Assembly and Task Planning Besangon, France Jul. 10-11, 2003, pp. 259-263.*

Abdel-Malek et al., Sweeping of an object held by a robotic end-effector, 2005, Robotics and Computer-Integrated Manufacturing 21, pp. 159-173.*

Abdel-Malek et al., Swept Volumes: Fundation, Perspectives, and Applications, 2006, International Journal of Shape Modeling, vol. 12, No. 1, 2006, pp. 87-127, © World Scientific Publishing Company.*

International Search Report (in English language) issued in International Application No. PCT/JP2011/004100 on Oct. 25, 2011.

Yusuke Maeda et al., "*Teaching of Industrial Manipulators by Manual Volume Sweeping*", Transactions of the Japan Society of Mechanical Engineers (Series C), vol. 74, No. 737 (Jan. 2008), article No. 07-0733, Jan. 25, 2008, pp. 115-120, with partial English translation.

Tsutomu Hasegawa et al., "*Collison-Free Path Planning of a Telerobotic Manipulator based on Swept Volume of Teleoperated Manipulator*", Journal of the Robotics Society of Japan, vol. 22, No. 4, May 15, 2004.

Tsutomu Hasegawa et al., "*Rapid Acquisition of Free-space and Operator support in telerobotic system*", The 22nd Annual Conference of the Robotics Society of Japan Yokoshu CD-ROM (2004), The Robotics Society of Japan, Sep. 15, 2004.

Office Action issued Aug. 6, 2014 in corresponding Chinese patent application No. 201180007494.0 (with partial English translation).

Tsutomu Hasegawa et al., "Toward On-line Transition to Autonomous Teleoperation from Master-slave Manipulation", Proceedings of the 2004 IEEE International Conference on Robotics & Automation, New Orleans, LA, Apr. 2004, pp. 3715-3720.

* cited by examiner

FIG. 3
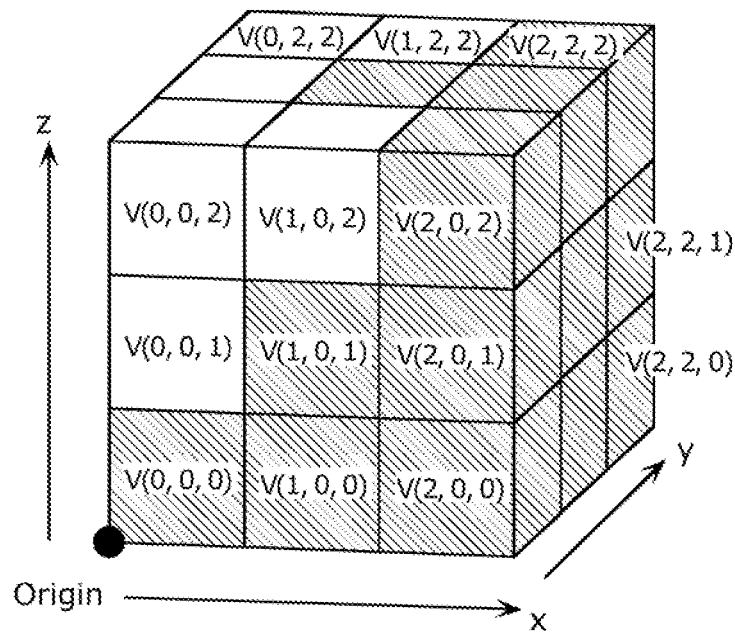
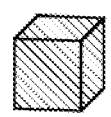 Voxel having logical value of false
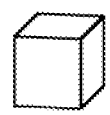 Voxel having logical value of true 701 — Voxel having logical value not changed by motion space identification unit 102

702 — Voxel having logical value set to true by motion space identification unit 102

FIG. 12
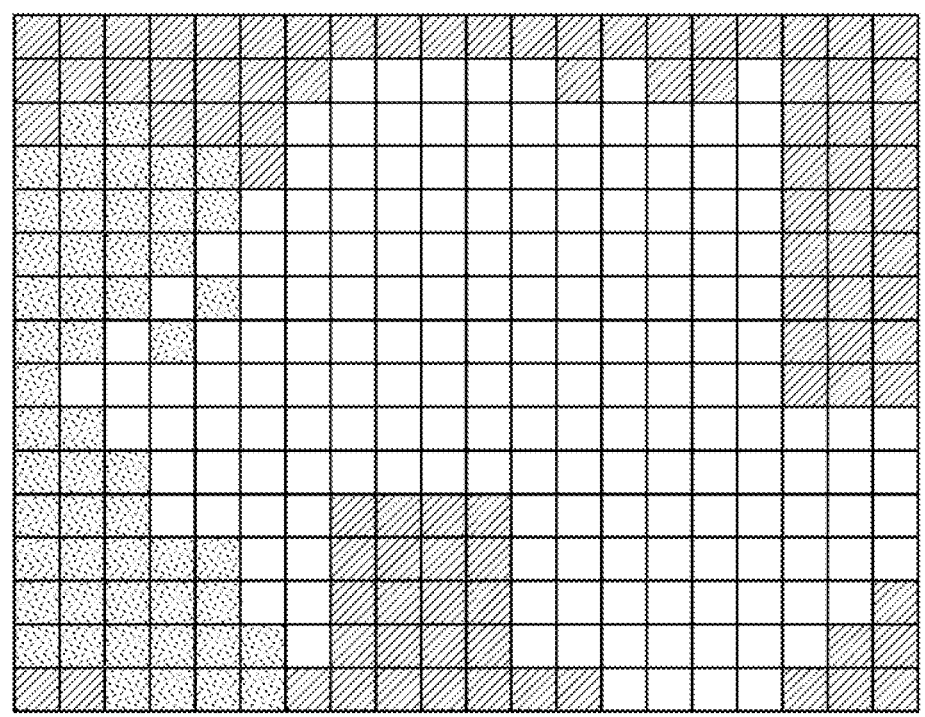
1202
 Voxel having logical value of false
 Voxel having logical value set to true by motion space identification unit 102 (R)
 Voxel having logical value set to true not by motion space identification unit 102 but by human-occupied space identification unit 105 (H-R)
1203
1204

2501
☒ Voxel having logical value not changed by motion space identification unit 102
☐ Voxel having logical value set to true by motion space identification unit 102
2502

FIG. 26
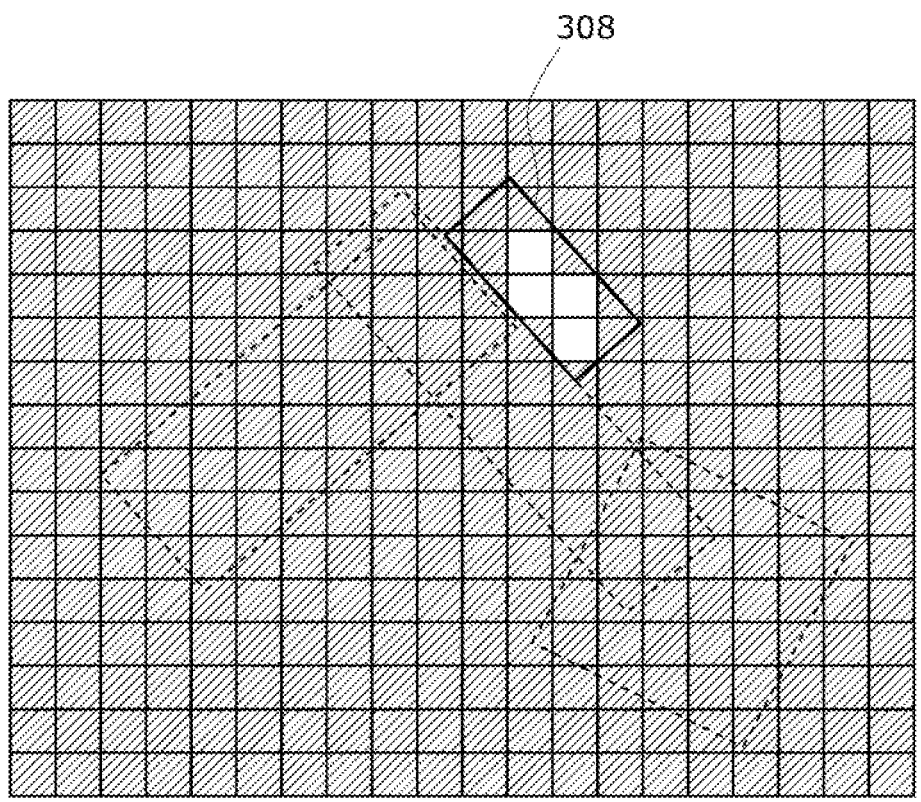
2601
Voxel having logical value not changed by jig-occupied space identification unit 123
Voxel having logical value set to true by jig-occupied space identification unit 123
2602

2801 ▨ Voxel having logical value of false

□ Voxel having logical value set to true by motion space identification unit 102 (R)

▦ Voxel having logical value set to true not by motion space identification unit 102 but by jig-occupied space
2802 identification unit 123 (S-R)
2803

FIG. 29
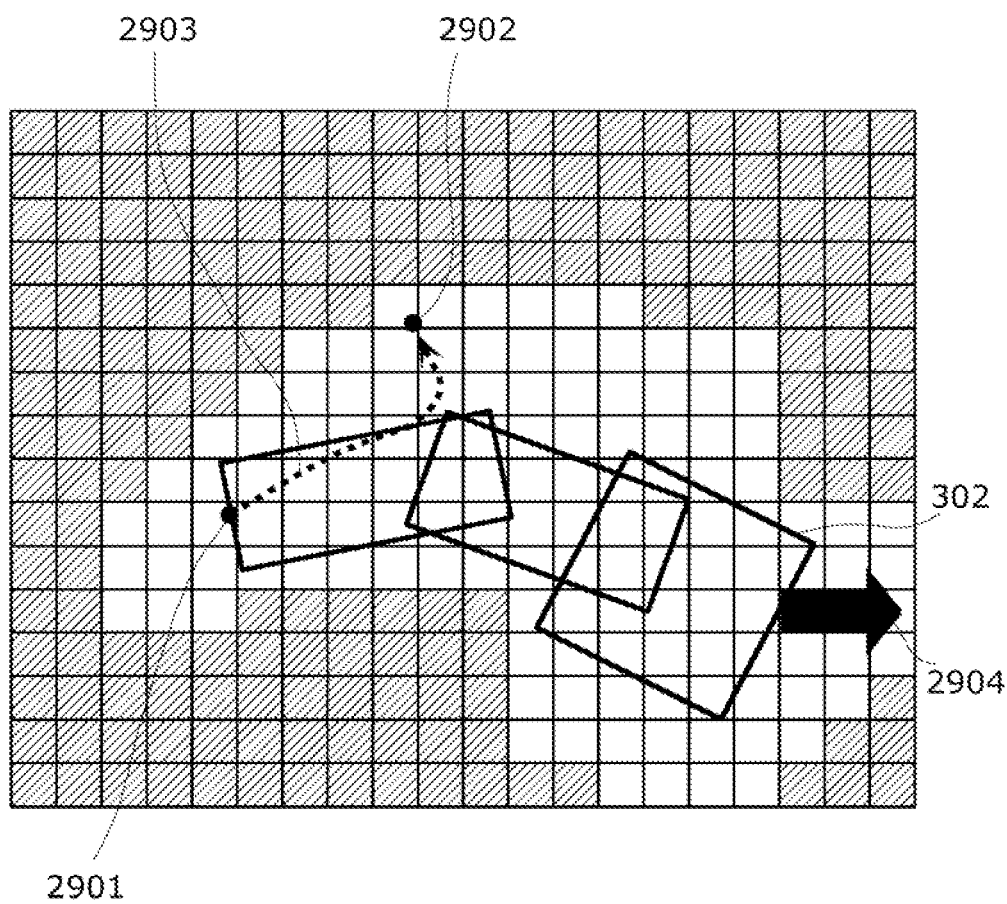
 Voxel having logical value of false
 Voxel having logical value set to true by motion space identification unit 102 (R)

Manual Volume Sweeping

Swept Volume as a Part of Free Space

Motion Planning within Swept Volume

MOTION PATH SEARCH DEVICE AND METHOD OF SEARCHING FOR MOTION PATH

CROSS REFERENCE TO RELATED APPLICATION

This is a continuation application of PCT Patent Application No. PCT/JP2011/004100 filed on Jul. 20, 2011, designating the United States of America, which is based on and claims priority of Japanese Patent Application No. 2010-168660 filed on Jul. 27, 2010. The entire disclosures of the above-identified applications, including the specifications, drawings and claims are incorporated herein by reference in their entirety.

TECHNICAL FIELD

Devices and methods consistent with one or more exemplary embodiments of the present disclosure relate generally to a motion path search device which searches for a motion path of a movable part of a robot for which direct teaching is possible, and a method of searching for a motion path.

BACKGROUND ART

In order to let a conventional robot perform desired work such as assembling or machining, it is necessary that an operator teach the robot motion using an operation device such as a teaching pendant or a force sensor.

In general, a robot makes motions, surrounded by many obstacles (for example, a jig for fixing an object to be assembled or machined, or a base unit for fixing the robot) which have complicated shapes and restrict its free motion. The operator teaches the robot via points to be passed through or a posture to be taken changing its posture so that the robot can avoid the obstacles.

However, the robot which merely passes through the via points accurately may make many wasteful motions, which leads to increase in cycle time of its automated operation. In order to avoid this, the operator needs to optimize the via points or motion paths of the robot through trial-and-error coordination in which the operator actually operates the robot at low speed. However, such trial-and-error coordination involves high time cost or much property damage due to a careless mistake. Such cost and damage sharply increase when the operator has little experience.

In view of this, a method has been proposed in which, during direct teaching, a robot automatically obtains a space accessible to the robot, and the robot automatically generates an optimum path for its automatic operation (for example, see NPL 1). In the method disclosed in NPL 1, a robot automatically obtains a space swept through by its body in direct teaching (hereinafter referred to as a swept space) as an accessible space, and uses the automatically obtained space as a search space within which the robot searches for an optimum path.

The term "direct teaching" means a teaching method in which an operator teaches a robot a motion by directly moving the robot using the operator's body (such as a hand). A robot which can be taught by direct teaching controls its movable part according to external force detected by a force sensor, for example.

The term "swept space" means a space through which an object has moved. In other words, a swept space is a set of spaces temporarily occupied by an object. Therefore, a swept space of a robot in direct teaching is a set of spaces where the robot has moved or stopped in the direct teaching.

FIG. 34 schematically shows conventional processing for obtaining an accessible space and processing for searching for an optimum path. According to NPL 1, an operator 201 teaches a robot 202 a motion by direct teaching using a force sensor mounted on the end of the robot 202. An accessible space 203 is calculated by combining spaces occupied by the robot 202 itself in direct teaching. Then, a motion path 204 between two points is searched for within the calculated accessible space 203. In other words, the accessible space 203 is used as a search space. The robot 202 moves along the motion path 204 determined as a result of the searching so that the robot 202 can automatically works, avoiding the obstacle.

CITATION LIST

Non Patent Literature

[NPL 1] Maeda et al., "Teaching of Industrial Manipulators by Manual Volume Sweeping", Transactions of the Japan Society of Mechanical Engineers (Series C), vol. 74, no. 737 (2008-1)

SUMMARY OF INVENTION

Technical Problem

However, the volume of the accessible space calculated using the method disclosed in NPL 1 is often smaller than the volume of a space which the robot can actually access. It is therefore difficult to determine a motion path with higher optimality.

In one or more exemplary embodiments of the present disclosure, conceived to overcome the disadvantage, a motion path search device and a method of searching for a motion path are provided by which a motion path with higher optimality can be determined with less increase in the load on an operator.

Solution to Problem

One or more exemplary embodiments of the present disclosure may overcome the above disadvantage and other disadvantages not described herein. However, it is understood that one or more exemplary embodiments of the present disclosure are not required to overcome or may not overcome the disadvantages described above and other disadvantages not described herein.

According to an exemplary embodiment of the present disclosure, a motion path search device which searches for a motion path of a movable part of a robot capable of being taught a motion by direct teaching in which the robot is directly moved by an operator includes: a first space identification unit configured to identify a space swept through by the movable part of the robot in the direct teaching; a second space identification unit configured to identify a space swept through by at least a portion of a body of the operator in the direct teaching; a space combining unit configured to calculate, as an accessible space, a union of the space identified by the first space identification unit and the space identified by the second space identification unit; and a path search unit configured to search for a motion path of the movable part within the accessible space calculated by the space combining unit, wherein the second space identification unit is configured to identify the space swept through by the at least a portion of the body of the operator, by virtually placing a three-dimensional model in a three-dimensional space based on a three-dimensional position of the at least a portion of the body of the operator, and identifying a region occupied by the three-dimensional model in the three-dimensional space, the three-dimensional model having a shape of the at least a portion of the body of the operator.

It should be noted that these exemplary embodiments of the present invention can be implemented either generally or specifically as a system, a method, an integrated circuit, a computer program, a recording medium, or any combination of a system, a method, an integrated circuit, a computer program, and a recording medium.

Advantageous Effects of Invention

According to various exemplary embodiments of the present disclosure, it is possible to determine a motion path with higher optimality with less increase in the load on an operator.

BRIEF DESCRIPTION OF DRAWINGS

These and other advantages and features of exemplary embodiments of the present disclosure will become apparent from the following description thereof taken in conjunction with the accompanying drawings that illustrate general and specific exemplary embodiments of the present disclosure. In the drawings:

FIG. 3 is a diagram for illustrating voxels indicating a volume in a three-dimensional space in Embodiment 1;

FIG. 12 is a diagram for illustrating the accessible space calculated by the space combining unit in Embodiment 1;

FIG. 26 is a diagram for illustrating inclusion determination by a jig-occupied space identification unit in Embodiment 4;

FIG. 29 shows an example of a motion path determined using a conventional method;

Figure 1:
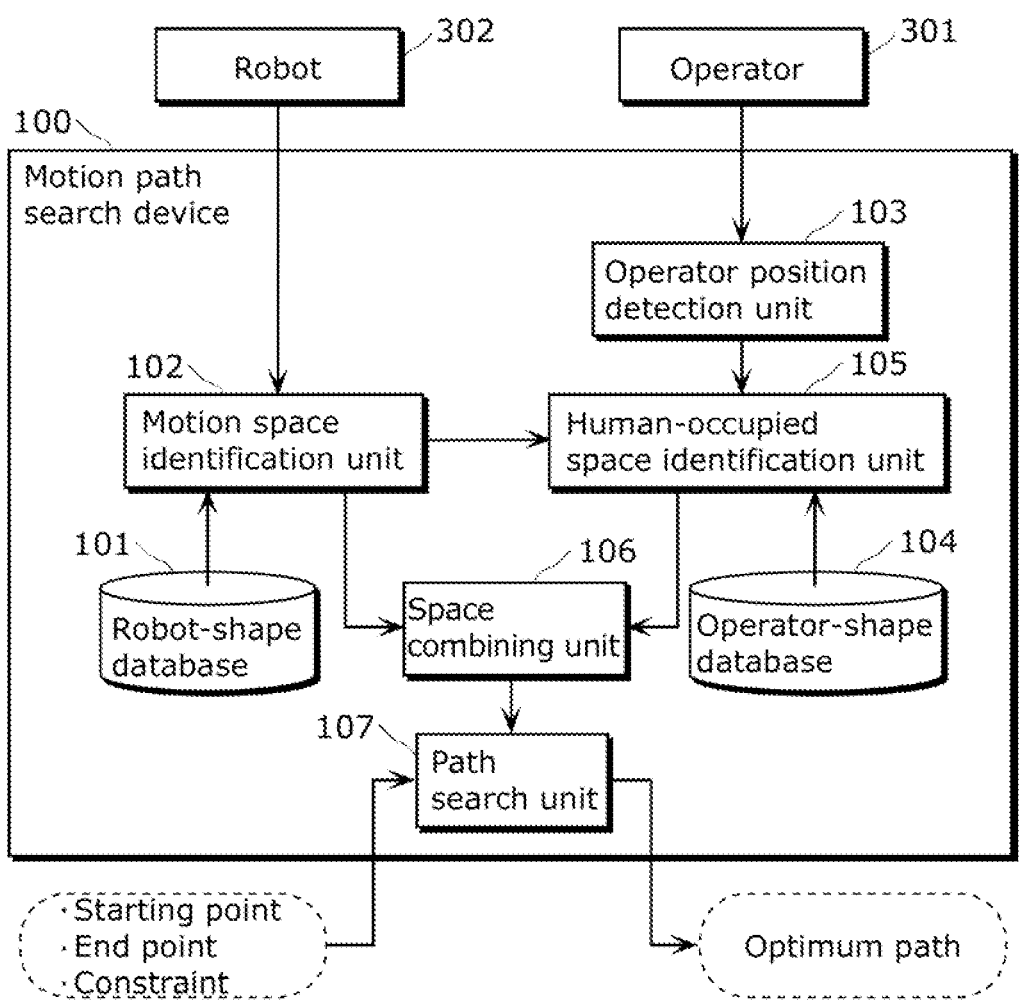
FIG. 1 is a block diagram showing a basic functional configuration of a motion path search device in Embodiment 1.

DESCRIPTION OF EMBODIMENTS (Underlying Knowledge Forming Basis of this Disclosure)

In the conventional technique, it is possible for the operator to obtain an accessible space of sufficient volume by, for example, further teaching the robot a motion so that an accessible space is expanded. However, it is difficult for the operator to find a motion to teach in order to expand the accessible space. As a result, the operator repeats trial-and-error teaching for expansion of the accessible space, which leads to increase in cost of teaching.

In view of this, according to an exemplary embodiment of the present disclosure, a motion path search device which searches for a motion path of a movable part of a robot capable of being taught a motion by direct teaching in which the robot is directly moved by an operator includes: a first space identification unit configured to identify a space swept through by the movable part of the robot in the direct teaching; a second space identification unit configured to identify a space swept through by at least a portion of a body of the operator in the direct teaching; a space combining unit configured to calculate, as an accessible space, a union of the space identified by the first space identification unit and the space identified by the second space identification unit; and a path search unit configured to search for a motion path of the movable part within the accessible space calculated by the space combining unit.

In this configuration, a union of a space swept through by the robot in direct teaching and a space swept through by at least one of at least a portion of the body of the operator and the space teaching jig in the direct teaching can be calculated as an accessible space within which a motion path is searched for. In other words, a space not swept through by the robot in the direct teaching can be included in the accessible space. Since the obtained accessible space additionally contains a space expanded from the space swept through by the robot, it is possible to determine a motion path with higher optimality. In addition, since an accessible space can be calculated using the space swept through by at least one of a portion of the body of the operator and a space teaching jig in the direct teaching, the operator need not repeat trial-and-error teaching only for expansion of an obtained accessible space. Thus, increase in the load on the operator can be also reduced.

For example, the second space identification unit may be configured to identify the space swept through by the at least a portion of the body of the operator, by virtually placing a three-dimensional model in a three-dimensional space based on a three-dimensional position of the at least a portion of the body of the operator, and identifying a region occupied by the three-dimensional model in the three-dimensional space, the three-dimensional model having a shape of the at least a portion of the body of the operator.

In this configuration, it is possible to identify a space swept through by at least a portion of the body of the operator based on the three dimensional position of at least the portion of the body of the operator. Thus, the space swept through by at least the portion of the body of the operator can be identified using a relatively simple configuration.

For example, the robot may have a handle part which the operator grasps in the direct teaching, and the second space identification unit may be configured to identify the space swept through by the at least a portion of the body of the operator, by virtually placing the three-dimensional model in the three-dimensional space based on a three-dimensional position of an elbow of the operator and a three-dimensional position of the handle part, and identifying a region occupied by the three-dimensional model in the three-dimensional space, the three-dimensional model having a shape of a forearm of the operator.

In this configuration, a space swept through by a forearm of the operator can be identified with higher accuracy using the three-dimensional position of the handle part of the robot.

For example, the three-dimensional model may have a cylindrical shape.

In this configuration, the cylindrical shape approximates the shape of the forearm of the operator so that processing load in identification of a space swept through by the forearm of the operator can be reduced.

For example, the motion path search device may further include an operator-shape obtainment unit configured to obtain a height of the cylindrical shape of the three-dimensional model based on a distance between the three-dimensional position of the handle part and the three-dimensional position of the elbow of the operator, wherein the second space identification unit may be configured to virtually place, in the three-dimensional space, the three-dimensional model having the cylindrical shape and the height obtained by the operator-shape obtainment unit.

In this configuration, the height of the cylindrical shape can be obtained based on the distance between the three-dimensional position of the handle part and the three-dimensional position of the elbow of the operator so that the difference between the cylindrical shape and the forearm of the operator in shape can be reduced. As a result, the space swept through by the forearm of the operator can be identified with high accuracy. In addition, since the operator need not directly measure the length of the operator's forearm, increase in load on the operator can be avoided.

For example, the motion path search device may further include an operator-shape determination unit configured to determine a forearm being used by the operator for the direct teaching, by comparing a distance between a three-dimensional position of a left elbow of the operator and the three-dimensional position of the handle part with a predetermined threshold and comparing a distance between a three-dimensional position of a right elbow of the operator and the three-dimensional position of the handle part with a predetermined threshold, wherein the second space identification unit is configured to identify a space swept through by the forearm which the operator-shape determination unit determines as being used.

In this configuration, the forearm used in the direct teaching can be determined based on the three-dimensional positions of the right and left elbows. This makes it possible to avoid identifying a space swept through by the forearm of the operator based on the three-dimensional position of the elbow of the arm not used for the teaching by the operator. As a result, the space swept through by the forearm of the operator can be identified with high accuracy.

For example, the motion path search device may further include an operator-shape database storing shape data indicating a shape of the at least a portion of the body of the operator, wherein the second space identification unit may be configured to virtually place, in the three-dimensional space, the three-dimensional model having the shape indicated by the shape data stored in the operator-shape database.

In this configuration, a three-dimensional model can be generated based on a shape indicated by shape data stored in the operator-shape database. Thus, the space swept through by at least a portion of the body of the operator can be identified with higher accuracy.

For example, the motion path search device may further include an operator position detection unit configured to detect the three-dimensional position of the at least a portion of the body of the operator, wherein the second space identification unit may be configured to virtually place the three-dimensional model in a three-dimensional space based on the three-dimensional position detected by the operator position detection unit.

In this configuration, a three-dimensional model can be virtually placed in a three-dimensional space based on a detected three-dimensional position. Thus, the space swept through by at least a portion of the body of the operator can be identified with higher accuracy.

For example, the second space identification unit may be configured to identify the space swept through by the space teaching jig by virtually placing a three-dimensional model having a shape of the space teaching jig in a three-dimensional space based on a part of the robot where the space teaching jig is mounted, and identifying a region occupied by the three-dimensional model in the three-dimensional space.

In this configuration, a space swept through by a space teaching jig can be identified based on a part where the space teaching jig is mounted. Thus, the space swept through by the space teaching jig can be identified using a relatively simple configuration.

For example, the motion path search device may further include a jig detection unit configured to detect the part of the robot where the space teaching jig is mounted, and the second space identification unit may be configured to virtually place the three-dimensional model in the three-dimensional space based on the part detected by the jig detection unit.

In this configuration, a three-dimensional model can be virtually placed in a three-dimensional space based on a detected part of the robot. This makes it no longer necessary for the operator to manually enter a part of the robot so that the load on the operator can be reduced.

For example, the motion path search device may further include a jig-shape database storing shape data items each in association with an identifier, each of the shape data items indicating a shape of a space teaching jig, the jig detection unit may be further configured to detect an identifier of the space teaching jig, and the second space identification unit may be configured to read a shape data item associated with the identifier detected by the jig detection unit from the jig-shape database, and virtually place, in the three-dimensional space, the three-dimensional model having a shape indicated by the read shape-data item.

In this configuration, it is no longer necessary for the operator to manually enter an identifier of a space teaching jig even when a plurality of space teaching jigs is used in direct teaching, and thereby load on the operator is reduced.

For example, the motion path search device may further include a notification unit configured to notify that the space teaching jig needs to be removed from the robot, when the space teaching jig remains on the robot after the direct teaching is completed.

In this configuration, the motion path search device can notify the operator or a worker after direct teaching is completed that the space teaching jig needs to be removed from the robot. This prevents the operator or the worker from starting work using the robot with the space teaching jig mounted thereon, and thus increases safety in the work.

Furthermore, these exemplary embodiments of the present invention can be implemented either generally or specifically as a system, a method, an integrated circuit, a computer program, a recording medium, or any combination of a system, a method, an integrated circuit, a computer program, and a recording medium.

Hereinafter, certain exemplary embodiments of the present disclosure are described in greater detail with reference to the accompanying drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the inventive concept, the scope of which is defined in the appended Claims and their equivalents. Therefore, among the constituent elements in the following exemplary embodiments, constituent elements not recited in any one of the independent claims defining the most generic part of the inventive concept are not necessarily required in order to overcome the disadvantages.

Embodiment 1

FIG. 1 is a block diagram showing a basic functional configuration of a motion path search device 100 in Embodiment 1. As shown in FIG. 1, the motion path search device 100 includes a robot-shape database 101, a motion space identification unit 102, an operator position detection unit 103, an operator-shape database 104, a human-occupied space identification unit 105, a space combining unit 106, and a path search unit 107.

The robot-shape database 101 stores robot-shape data indicating the shape of a robot 302 which performs automated operation.

The motion space identification unit 102 corresponds to a first space identification unit. The motion space identification unit 102 identifies a space swept through by movable parts of the robot 302 in direct teaching.

Specifically, the motion space identification unit 102 identifies a space swept through by the movable parts of the robot 302 in direct teaching by determining spaces occupied by the robot 302 at points of time in the direct teaching, based on posture information of the robot 302 and the robot-shape data stored in the robot-shape database 101.

The operator position detection unit 103 detects the three-dimensional position of at least a portion of the body of an operator 301. In Embodiment 1, the operator position detection unit 103 detects a three-dimensional position of an elbow of the operator 301 teaching a motion to the robot 302. The portion for which the operator position detection unit 103 detects a three-dimensional position need not be an elbow and may be a joint area such as a shoulder or a wrist. Optionally, the operator position detection unit 103 may detect a three-dimensional position of another portion such as a shoulder or a wrist in addition to the three-dimensional position of an elbow.

The operator-shape database 104 stores operator-shape data indicating the shape of at least a portion of the body of the operator 301. In Embodiment 1, the operator-shape database 104 stores operator-shape data indicating the shape of a forearm of the operator 301. Optionally, the operator-shape database 104 further stores operator-shape data indicating the shape of an upper arm of the operator 301. Optionally, the operator-shape database 104 further stores operator-shape data indicating the shape of the entire body of the operator 301.

The human-occupied space identification unit 105 corresponds to a second space identification unit. The human-occupied space identification unit 105 identifies a space swept through by at least a portion of the body of the operator 301 in direct teaching. In Embodiment 1, the human-occupied space identification unit 105 identifies a space swept through by the forearm of the operator 301 in direct teaching.

Specifically, the human-occupied space identification unit 105 identifies a space occupied by the forearm of the operator 301 at points of time in direct teaching, based on the three-dimensional position of the elbow of the operator 301 detected by the operator position detection unit 103 and the operator-shape data stored in the operator-shape database 104. Then, the human-occupied space identification unit 105 identifies a union of the identified spaces as a space swept through by the forearm of the operator 301.

It should be noted that the space identified by the human-occupied space identification unit 105 need not to be a space swept through by the forearm of the operator 301. For example, the human-occupied space identification unit 105 may identify a space swept through by an entire arm of the operator 301.

The space combining unit 106 calculates, as an accessible space for the robot 302, a union of a space received from the motion space identification unit 102 and a space received from the human-occupied space identification unit 105.

The path search unit 107 searches for a motion path of the movable part of the robot 302 within the accessible space calculated by the space combining unit 106. Specifically, the path search unit 107 searches among candidate motion paths within the accessible space for an optimum motion path based on a given search condition. The search condition is, for example, the positions of a starting point and an end point, a criterion of optimality (such as precedence of time or precedence of power saving), or a constraint.

Next, a scene in which the motion path search device 100 is used shall be described below.

Figure 2:
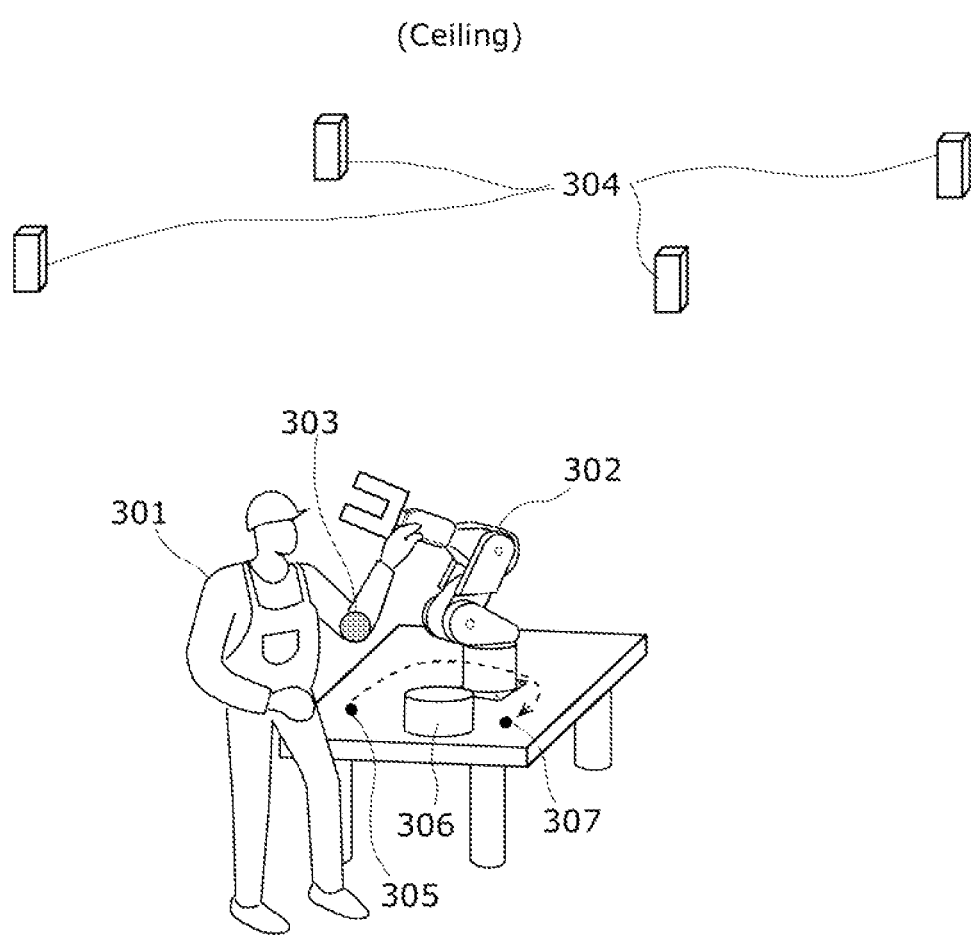
FIG. 2 shows a scene in which the motion path search device is used in Embodiment 1.

FIG. 2 shows a scene in which the motion path search device 100 is used in Embodiment 1. In FIG. 2, the operator 301 grasps a handle part which is a part of the robot 302 with a hand. The operator 301 is teaching a motion to the robot 302 by directly moving the movable part of the robot 302 from a starting point 305 to an end point 307 so as to avoid bringing the movable part into contact with an obstacle 306.

The operator 301 has a three-dimensional position measuring device 303 mounted on its elbow. In addition, a position sensing device 304 is installed in the work environment (for example, on the ceiling or the wall of the room where the robot is installed). The three-dimensional position measuring device 303 and the position sensing device 304 provide a known indoor global positioning system (GPS) using an ultra-wide band (UWB), for example. In other words, the operator position detection unit 103 includes the three-dimensional position measuring device 303 and the position sensing device 304 to detect a three-dimensional position of a portion of the body of the operator 301 where the three-dimensional position measuring device 303 is mounted.

The following describes a three-dimensional space in which a three-dimensional model is virtually placed. A closed region in a three-dimensional space is indicated by voxels. A voxel is a cube of a certain size and is a basic unit of the volume of a three-dimensional space as shown in FIG. 3. The voxel located at a three-dimensional position (x, y, z) from the origin is indicated as V(x, y, z). The voxel V(x, y, z) has a logical value M(x, y, z) which indicates whether or not the voxel V(x, y, z) is accessible to the robot 302.

When it is unknown whether or not there is an obstacle which blocks a motion of the robot 302 is within V(x, y, z), its logical value M(x, y, z) is indicated as Expression (1) below.

$$M(x,y,z)=\text{false Expression} \qquad (1)$$

When there is no obstacle which blocks a motion of the robot 302 within V(x, y, z) and the robot 302 can enter V(x, y, z), its logical value M(x, y, z) is indicated as Expression (2) below.

$$M(x,y,z)=\text{true} \qquad \text{Expression (2)}$$

In the example shown in FIG. 3, the voxels with hatched lines have a logical value of false, whereas the unpatterned voxels with no hatched lines have a logical value of true. In other words, in order to avoid an obstacle, the robot 302 needs to avoid entering the voxels with hatched lines and move through the voxels with no hatched lines. The accessible space is indicated as a set of voxels having a logical value of true using Expression (3) below.

$$U\{V(x,y,z)|M(x,y,z)=\text{true}\} \qquad \text{Expression (3)}$$

As such, whether or not the robot 302 comes into contact with an obstacle, the three-dimensional space accessible to the robot 302 can be indicated by voxels. Before teaching, the logical values of all the voxels are set to false. In other words, accessibility of the entire working envelope of the robot 302 is unknown before teaching.

Next, the robot 302 in Embodiment 1 shall be described below.

Figure 4:
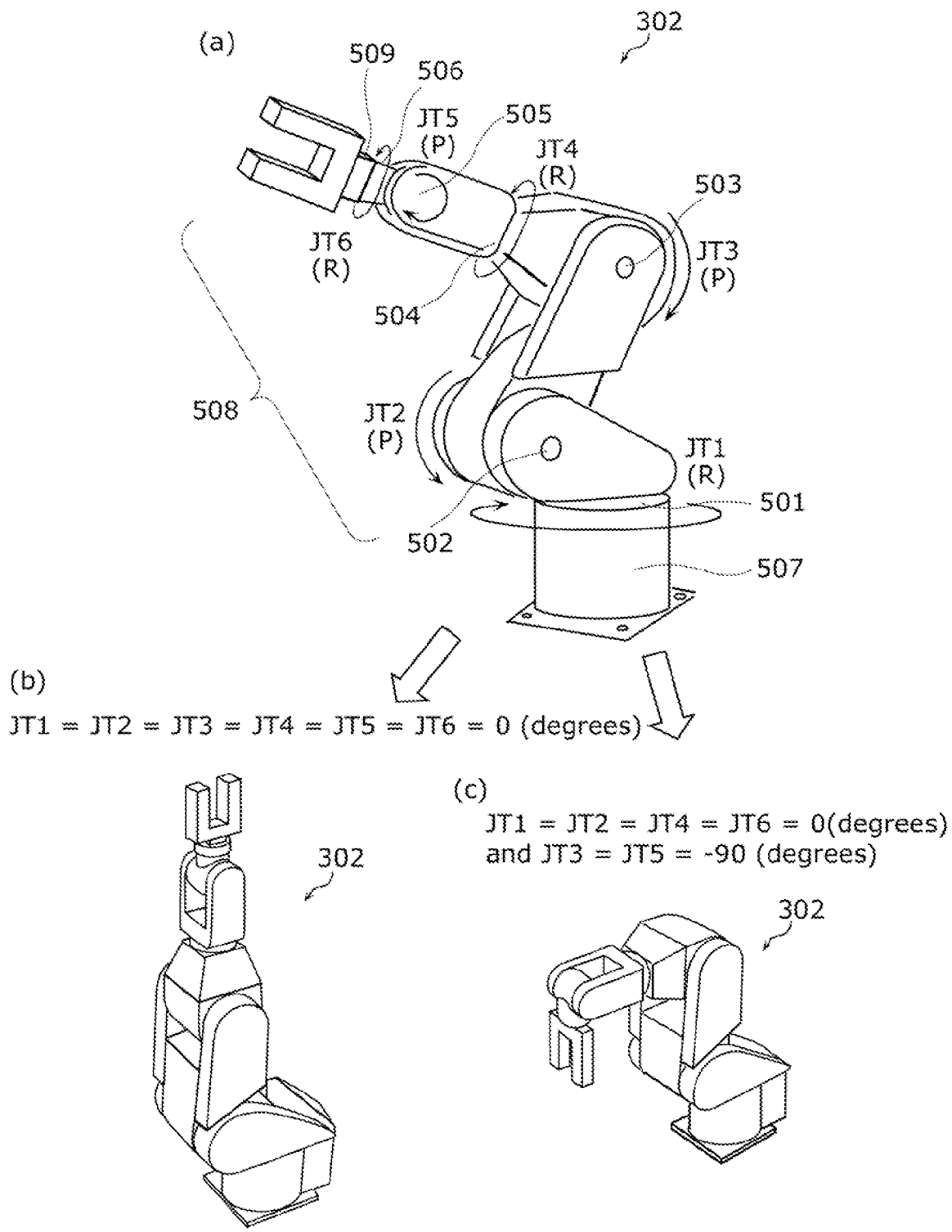
FIG. 4 illustrates an external view of the robot in Embodiment 1.

FIG. 4 illustrates an external view of the robot 302 in Embodiment 1. The robot 302 is, for example, a 6-axis vertical articulated robot. As shown in (a) in FIG. 4, the configuration of the robot 302 in Embodiment 1 is R-P-P-R-P-R (R for rotational and P for parallel).

A combination of the angles of six rotational axes 501 to 506 are indicated as (JT1, JT2, JT3, JT4, JT5, JT6). The posture of the robot 302 is uniquely determined by a combination of the angles of the six rotational axes 501 to 506.

The robot-shape database 101 stores robot-shape data representing the shape of the robot shown in FIG. 4 as a closed region using segments of straight or curved lines. Accordingly, with a combination (JT1, JT2, JT3, JT4, JT5, JT6), the motion space identification unit 102 can calculate a unique three-dimensional position of the movable part 508 relative to a stationary part 507 based on the robot-shape data.

For example, in the case where the robot 302 is calibrated so as to take an upright posture as shown in (b) in FIG. 4 when JT1=JT2=JT3=JT4=JT5=JT6=0 (degrees), the robot 302 takes a posture as shown in (c) in FIG. 4 when JT1=JT2=JT4=JT6=0 (degrees) and JT3=JT5=−90 (degrees).

In direct teaching, the operator 301 can change the posture of the robot 302 by applying power to a force sensor installed inside the robot 302, grasping the handle part 509 of the robot 302.

The robot 302 may be a vertical articulated robot having a configuration other than R-P-P-R-P-R. The robot 302 may be a horizontal articulated robot. The robot 302 may be a combination of single-axis robots.

Next, operations of the motion path search device 100 having the above-described configuration shall be described below.

Figure 5:
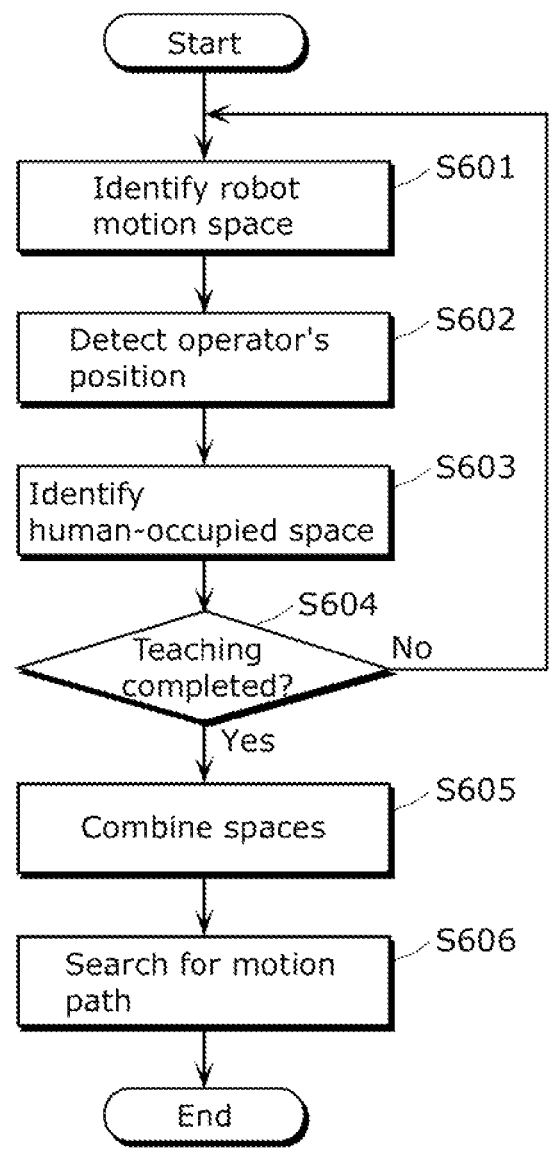
FIG. 5 is a flowchart showing a process of searching for a motion path in Embodiment 1.

FIG. 5 is a flowchart showing the process of searching for a motion path in Embodiment 1. In the direct teaching described below, the operator 301 teaches the robot 302 a motion from the starting point 305 to the end point 307, moving around the obstacle 306.

The operator 301 performs direct teaching while grasping the handle part 509 of the robot 302, so that the values (JT1, JT2, JT3, JT4, JT5, JT6) indicating the angles of the rotational axes change whereby the robot 302 changes its posture.

At this time, the motion space identification unit 102 identifies a space occupied by the movable part 508 of the robot 302 (S601). Specifically, first the motion space identification unit 102 obtains the values indicating the angles of the rotational axes of the robot 302 as posture information from the robot 302 at regular intervals T. Next, the motion space identification unit 102 obtains robot-shape data stored in the robot-shape database 101. Then, the motion space identification unit 102 performs inclusion determination as to whether or not each of the voxels in the space is located inside the robot 302, based on the obtained posture information and robot-shape data. The inclusion determination is a process of determining whether or not all points in a voxel is within a closed region indicated by robot-shape data (this is hereinafter described as "a voxel is included in the robot 302") using a method such as a known "point-in-polygon test".

The motion space identification unit 102 determines a voxel included in the robot 302 as being an accessible voxel, and therefore sets the logical value of the voxel to true. On the other hand, the motion space identification unit 102 does not change the logical value of a voxel not included in the robot 302. The motion space identification unit 102 identifies a three-dimensional space composed of a set of voxels having a logical value of true as a result of the inclusion determination as a space occupied by the movable part 508 of the robot 302.

The process performed by the motion space identification unit 102 shall be described in more detail below using FIG. 6 and FIG. 7.

Figure 6:
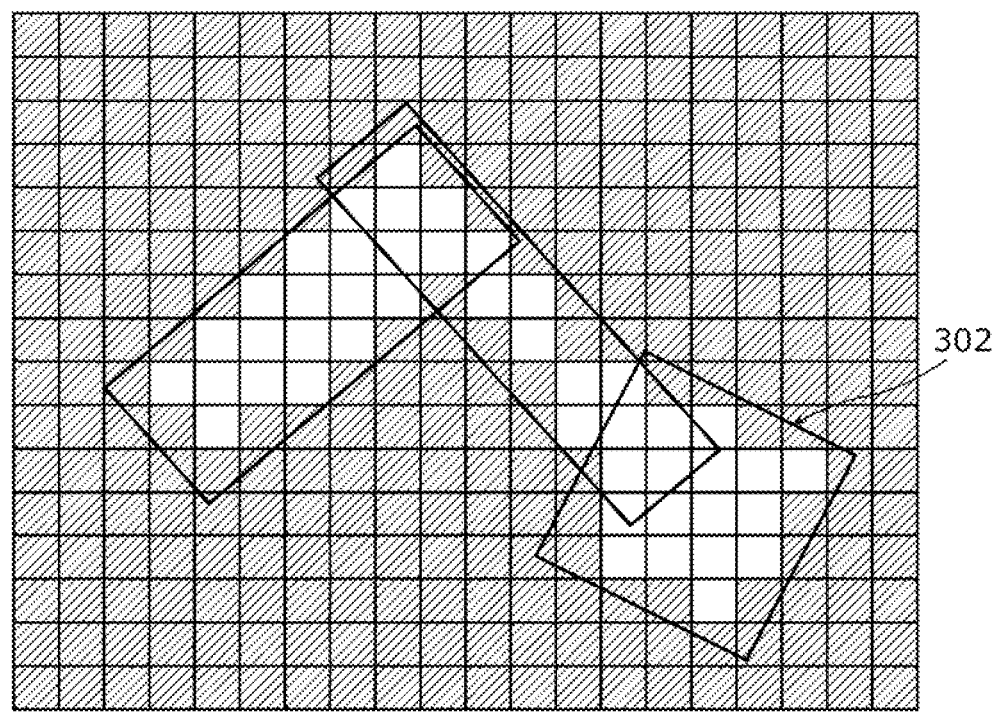
FIG. 6 is a diagram for illustrating inclusion determination by a motion space identification unit in Embodiment 1.
Figure 7:
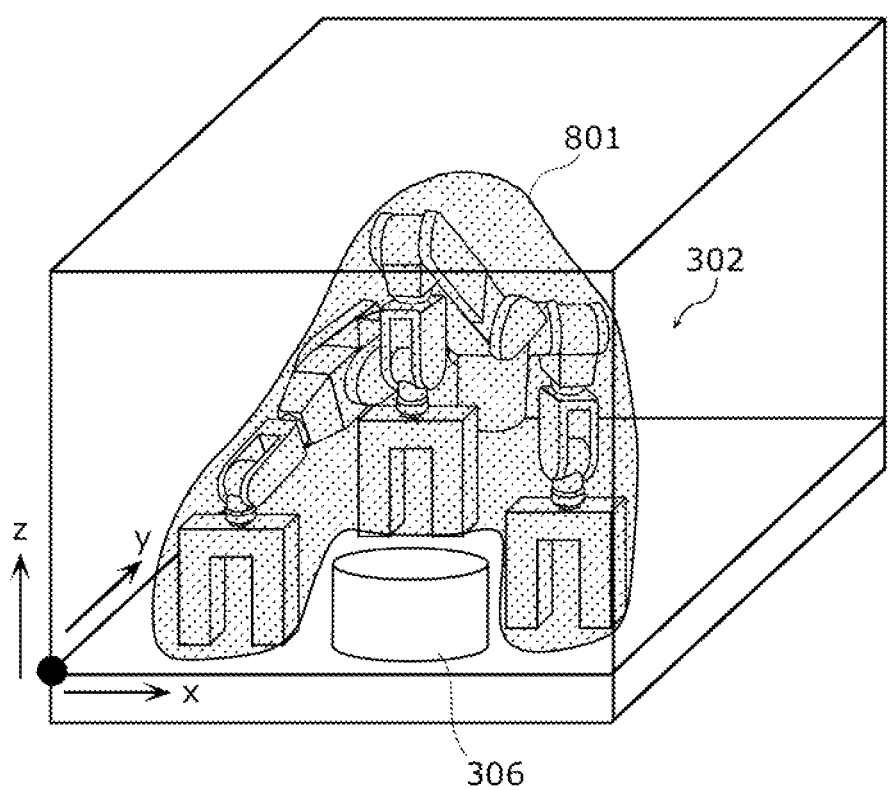
FIG. 7 is a diagram showing an example of a space identified by the motion space identification unit in Embodiment 1.

FIG. 6 is a diagram for illustrating the inclusion determination by the motion space identification unit 102 in Embodiment 1. FIG. 7 is a diagram showing an example of a space identified by the motion space identification unit 102 in Embodiment 1.

FIG. 6 shows positional relationships between the voxels and a part of the robot 302 using a projection thereof on a two-dimensional plane for simplicity. As shown in FIG. 6, the logical values of voxels 702 included in the robot 302 are set to true. In other words, the logical values of voxels 701 having any part outside the robot 302 are not changed.

The set R of the voxels determined as being accessible by the motion space identification unit 102 can be calculated using Expression (4) below.

$$R = U\{V(x,y,z) | M(x,y,z) = \text{true}\} \quad \text{Expression (4)}$$

The motion space identification unit 102 identifies the set R of the voxels as a space occupied by the robot 302. The union of such sets R of voxels calculated at points of time in direct teaching corresponds to a swept space 801 of the robot 302 as shown in FIG. 7. The set R of voxels is hereinafter referred to as a robot swept space R as necessary.

Again, the flowchart in FIG. 5 shall be described below.

The operator position detection unit 103 detects three-dimensional positions G_h of an elbow of the operator 301 at regular intervals T using the three-dimensional position measuring device 303 and the position sensing device 304 (S602).

Next, the human-occupied space identification unit 105 identifies a space occupied by a forearm of the operator 301 (S603). Specifically, the human-occupied space identification unit 105 virtually places a three-dimensional model having the shape of the forearm of the operator 301 in a three-dimensional space based on the three-dimensional position of the elbow of the operator 301. Then, the human-occupied space identification unit 105 identifies a region occupied by the three-dimensional model placed in the three-dimensional space.

More specifically, the human-occupied space identification unit 105 virtually places a three-dimensional model having the shape of the forearm of the operator 301 in a three-dimensional space based on the detected three-dimensional position G_h of the elbow of the operator 301 and the operator-shape data stored in the operator-shape database.

The operator-shape data stored in the operator-shape database shall be described below using FIG. 8.

Figure 8:
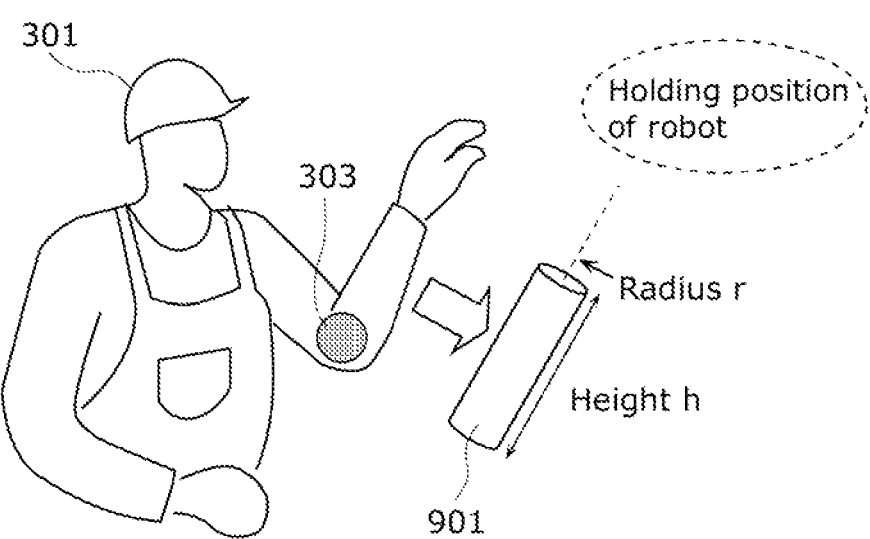
FIG. 8 shows an example of an operator-shape data stored in an operator-shape database in Embodiment 1.

FIG. 8 shows an example of the operator-shape data stored in the operator-shape database 104 in Embodiment 1. The operator-shape database 104 stores operator-shape data indicating an approximation of a forearm of the operator 301. For example, the approximation of a forearm has a cylindrical shape 901 as shown in FIG. 8. The cylindrical shape 901 is defined by two numerical parameters (a radius r and a height h). In Embodiment 1, for example, the radius r has a value previously entered by the operator 301 through an input unit not shown in the drawings. The cylindrical shape 901 need not be defined by the radius r and the height h. For example, a cylindrical shape may be defined by a circumferential length and a height.

For example, the radius r is the radius of the section having the shortest circumference of the forearm of the operator 301. It is thus possible to avoid wrongly calculating a space where an obstacle is present as a part of an accessible space due to use of an over-sized model of the forearm of the operator 301.

The shape of the forearm of the operator 301 need not be indicated by such a cylindrical shape but may be indicated by a shape close to the actual shape of the forearm. It should be noted that the load of the process of inclusion determination is larger for a three-dimensional model having a more complicated shape. Therefore, the three-dimensional model having such a relatively simple shape as in Embodiment 1 can be used.

The human-occupied space identification unit 105 virtually places a three-dimensional model having the cylindrical shape indicated by the operator-shape data in a three-dimensional space. More specifically, the human-occupied space identification unit 105 virtually places a three-dimensional model having the shape of the forearm of the operator 301 in a three-dimensional space using a three-dimensional position G_h of the elbow of the operator 301 and a three-dimensional position G_r of the handle part 509 of the robot 302 obtained from the motion space identification unit 102.

For example, the human-occupied space identification unit 105 virtually places a three-dimensional model in a three-dimensional space so that the height direction of the three-dimensional model coincides with the line segment connecting the three-dimensional position G_h of the elbow and the three-dimensional position G_r of the handle part 509. The three-dimensional position of the handle part 509 of the robot 302 is used in this manner so that the human-occupied space identification unit 105 can place a three-dimensional model having the shape of the forearm of the operator 301 more accurately.

Then, the human-occupied space identification unit 105 performs inclusion determination as to whether or not each of the voxels composing the three-dimensional space is located inside the three-dimensional model which is in the shape of the forearm of the operator 301 and virtually placed in the three-dimensional space. The inclusion determination is a process of determining whether or not all points in a voxel is within a closed region formed by the three-dimensional model representing the shape of the operator 301 (this is hereinafter described as "a voxel is included in the operator 301").

The human-occupied space identification unit 105 determines a voxel included in the operator 301 as being a voxel accessible to the robot 302, and therefore sets the logical value of the voxel to true. On the other hand, the human-occupied space identification unit 105 does not change the logical value of a voxel not included in the operator 301. The human-occupied space identification unit 105 identifies a three-dimensional space composed of a set of voxels having a logical value of true as a result of the inclusion determination as a space occupied by the forearm of the operator 301.

The process performed by the human-occupied space identification unit 105 shall be described in more detail below using FIG. 9 and FIG. 10.

Figure 9:
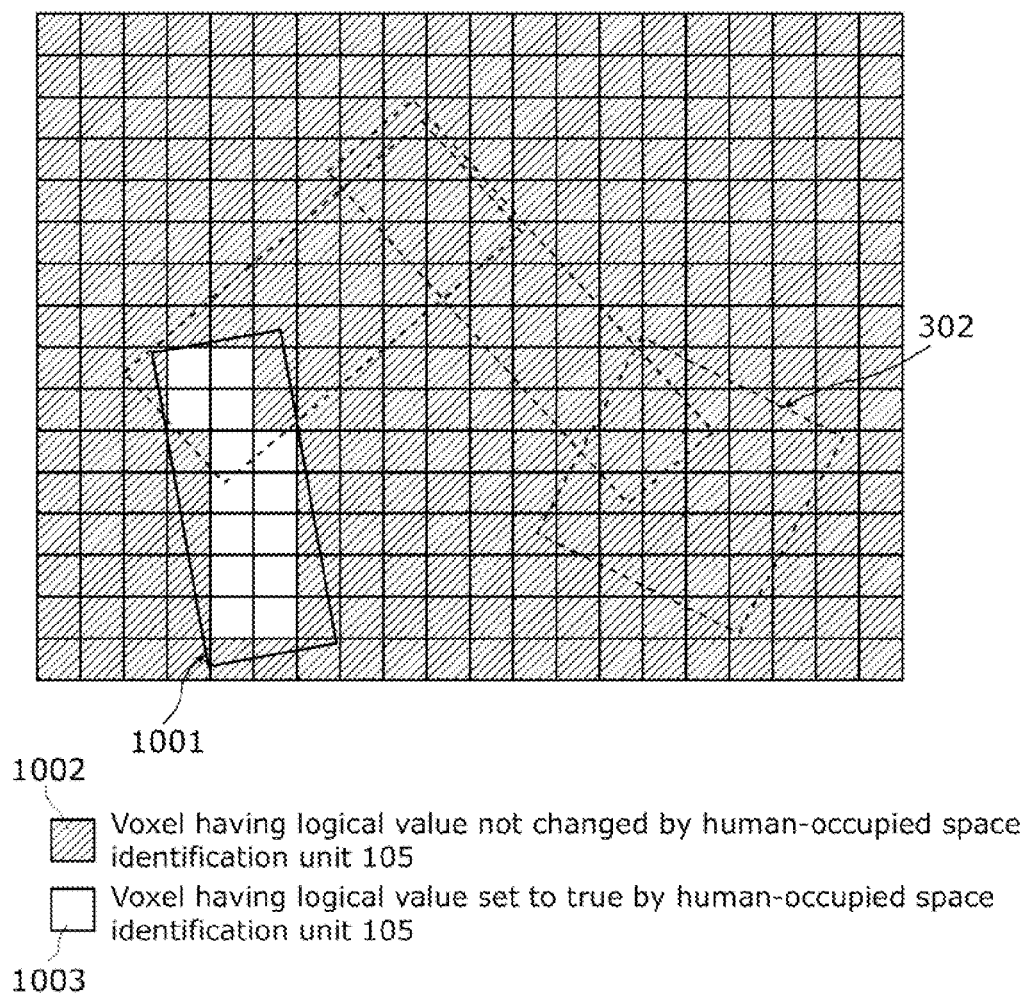
FIG. 9 is a diagram for illustrating inclusion determination by a human-occupied space identification unit in Embodiment 1.
Figure 10:
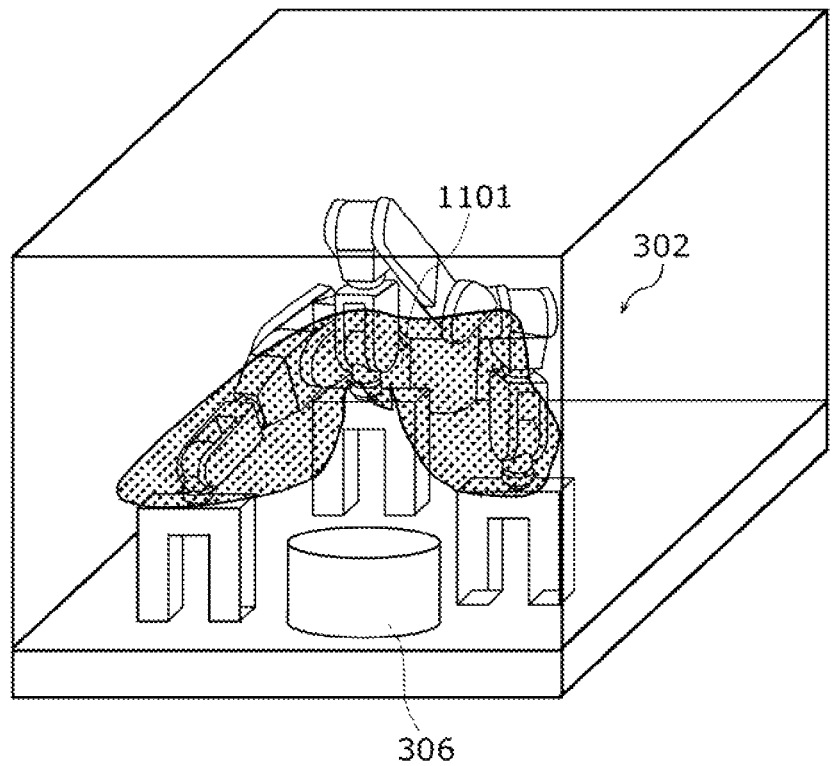
FIG. 10 is a diagram showing an example of a space identified by the human-occupied space identification unit in Embodiment 1.

FIG. 9 is a diagram for illustrating the inclusion determination by the human-occupied space identification unit 105 in Embodiment 1. FIG. 10 is a diagram showing an example of a space identified by the human-occupied space identification unit 105 in Embodiment 1.

FIG. 9 shows positional relationships between the voxels and a three-dimensional model 1001 having the shape of the forearm of the operator 301 using a projection thereof on a two-dimensional plane for simplicity. As shown in FIG. 9, the logical values of voxels 1003 included in the three-dimensional model 1001 are set to true. In other words, the logical values of voxels 1002 having any part outside the three-dimensional model 1001 are not changed.

The set H of the voxels determined as being accessible by the human-occupied space identification unit 105 can be calculated using Expression (5) below.

$$H = U\{V(x,y,z) | M(x,y,z) = \text{true}\}$$  Expression (5)

The human-occupied space identification unit 105 identifies the set H of the voxels as a space occupied by the operator 301. The union of such sets H of voxels calculated at points of time in direct teaching corresponds to a swept space 1101 of the operator 301 as shown in FIG. 10. The set H of voxels is hereinafter referred to as an operator swept space H as necessary.

Again, the flowchart in FIG. 5 shall be described below.

A determination is made as to whether or not the operator 301 has indicated completion of teaching (S604). The process from Steps S601 to S603 is repeated until the operator 301 indicates completion of teaching (No in S604). In other words, the motion space identification unit 102 continually identifies spaces occupied by the movable part 508 of the robot 302 at points of time in direct teaching and thereby identifies a swept space 801 swept through by the movable part 508 of the robot 302 as shown in FIG. 7. In addition, the human-occupied space identification unit 105 continually identifies spaces occupied by at least a portion of the body (a forearm in this example) of the operator 301 at points of time in direct teaching and thereby identifies a swept space 1101 swept through by at least the portion of the body of the operator 301 as shown in FIG. 10.

When the operator 301 has indicated completion of teaching (Yes in S604), the space combining unit 106 calculates, as an accessible space for the robot 302, a union R∪H of the set R of the accessible voxels received from the motion space identification unit 102 and the set H of the accessible voxels received from the human-occupied space identification unit 105 (S605). In other words, the space combining unit 106 calculates, as an accessible space, a union of the space identified by the motion space identification unit 102 and the space identified by the human-occupied space identification unit 105.

Figure 11:
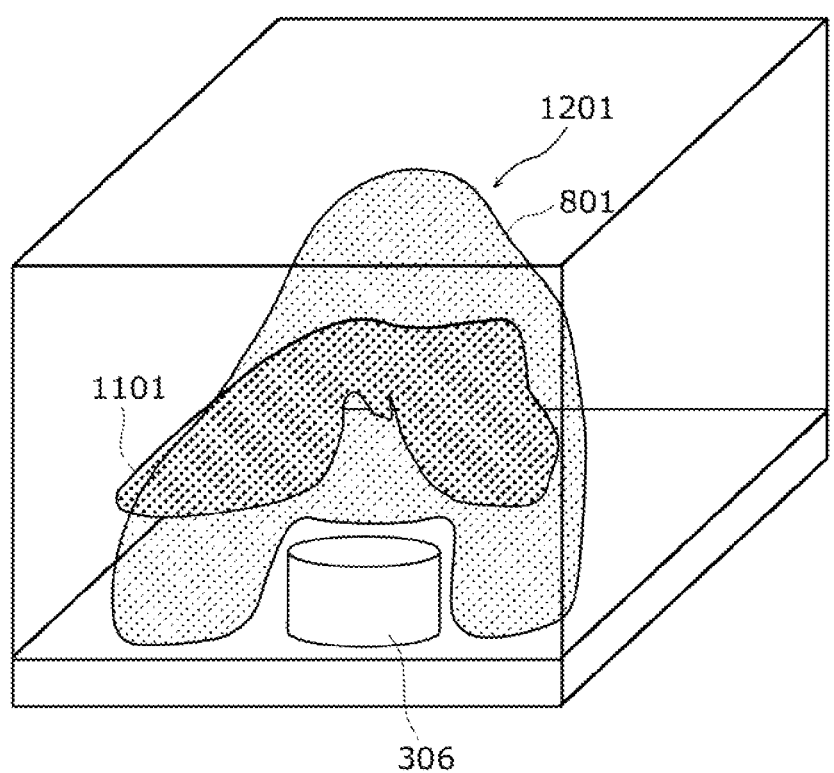
FIG. 11 is a diagram for illustrating an accessible space calculated by the space combining unit in Embodiment 1.

FIG. 11 and FIG. 12 are diagrams for illustrating the accessible space calculated by the space combining unit 106 in Embodiment 1. An accessible space 1201 shown in FIG. 11 corresponds to the union R∪H of the swept space 801 of the robot 302 and the swept space 1101 of the operator 301. FIG. 12 shows the union R∪H using a projection thereof on a two-dimensional plane for simplicity. The union R∪H corresponds to the region composed of unpatterned voxels 1203 and dotted voxels 1204. In other words, the union R∪H corresponds to the region composed of voxels other than voxels 1202 with hatched lines.

Again, the flowchart in FIG. 5 shall be described below.

Lastly the path search unit 107 searches for a motion path of the movable part 508 within the accessible space calculated by the space combining unit 106 (S606). Specifically, the path search unit 107 searches for a motion path using the accessible space calculated by the space combining unit 106 as a search space. As a result, the path search unit 107 can provide a path of higher optimality under given search conditions (the starting point and end point indicating three-dimensional positions and a constraint).

Figure 13:
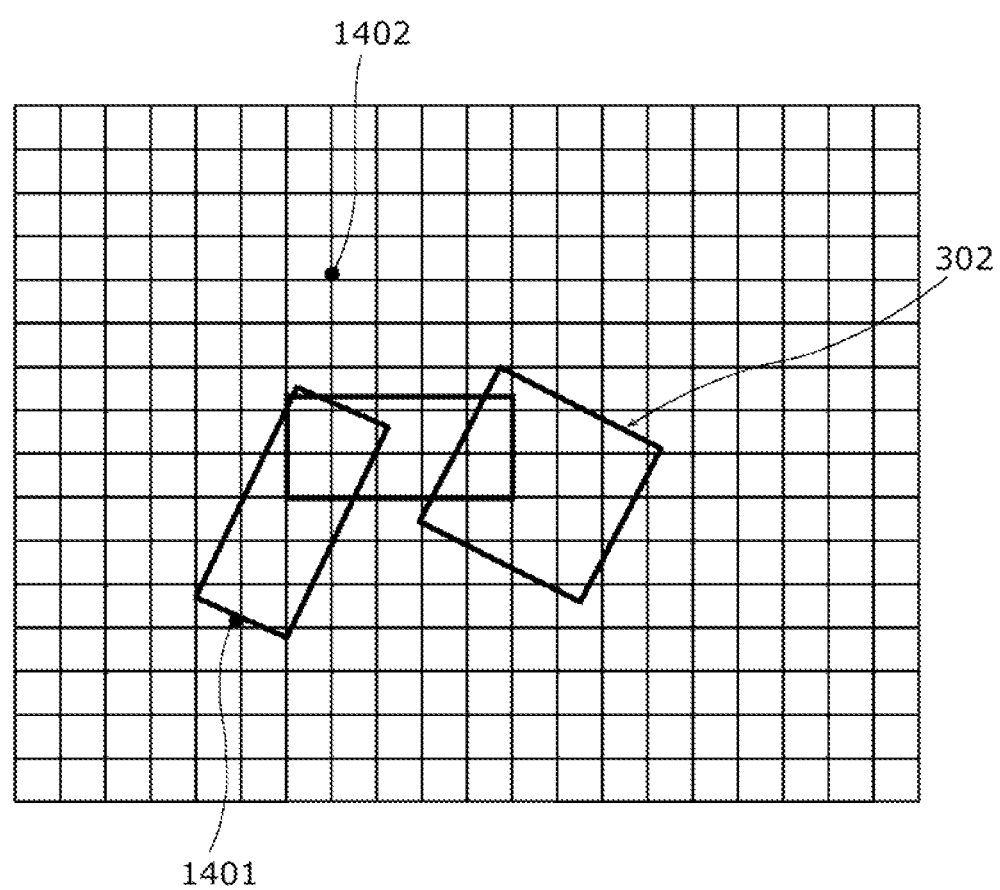
FIG. 13 is a diagram for illustrating an exemplary search condition.
Figure 14:
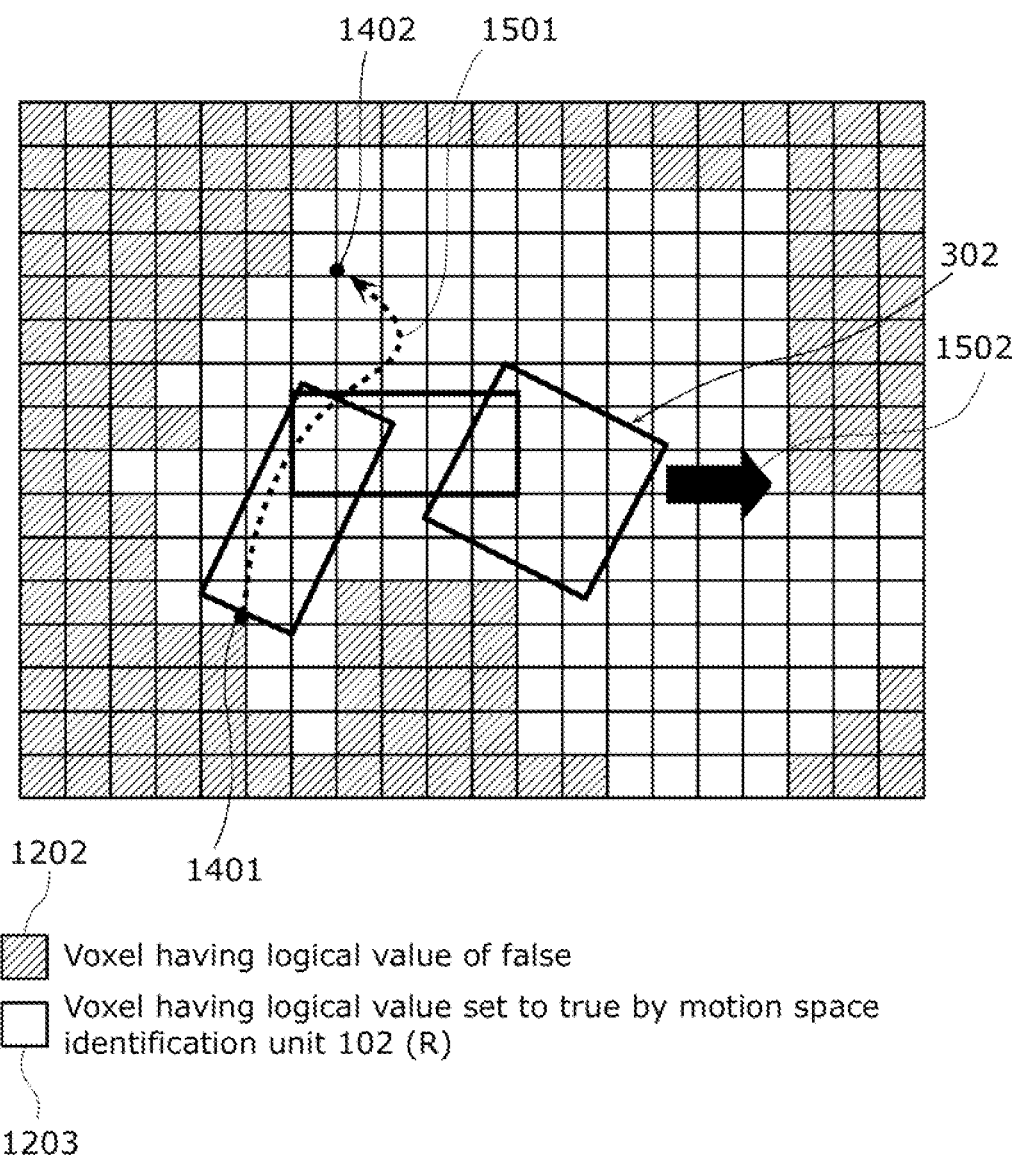
FIG. 14 shows an example of a motion path determined using a conventional method.
Figure 15:
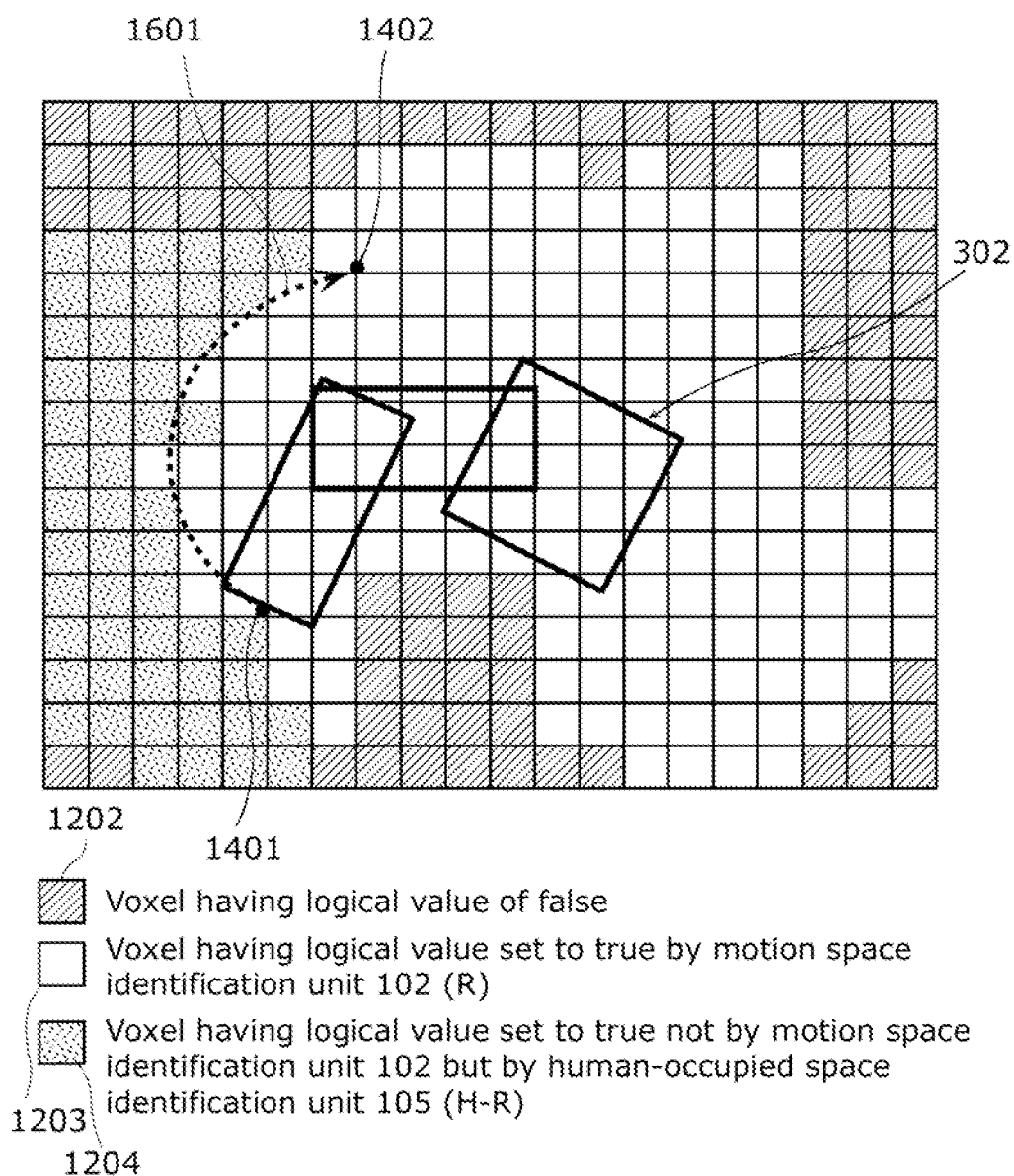
FIG. 15 shows an example of a motion path determined by the motion path search device in Embodiment 1.

The following describes an example of a motion path determined by the path search unit 107 in Embodiment 1 in comparison with a motion path determined using a conventional method, using FIG. 13 to FIG. 15.

FIG. 13 is a diagram for illustrating an exemplary search condition. FIG. 14 shows an example of a motion path determined using a conventional method. FIG. 15 shows an example of a motion path determined by the motion path search device 100 in Embodiment 1. FIG. 13 to FIG. 15 illustrate a projection of three-dimensional space on a two-dimensional plane for simplicity of description.

As shown in FIG. 13, the path search unit 107 searches for a motion path under a search condition that the end of the movable part 508 of the robot 302 is moved from a starting point 1401 to an end point 1402 in the shortest time.

In the conventional method, a motion path is searched for within a robot swept space R. Accordingly, the motion path 1501 determined as a result of the search is a complicated, curved path as shown in FIG. 14. In order to move the end of the movable part 508 along the motion path 1501, the entirety of the robot 302 needs to move in a direction 1502 and subsequently rotate. In other words, the motion path 1501 determined using the conventional method causes wasteful motions of the robot 302, thereby resulting in poor optimality.

In contrast, the motion path search device 100 in Embodiment 1 can search for a motion path using the operator swept space H in addition to the robot swept space R as shown in FIG. 15. In other words, the path search unit 107 can use a space including a space H–R (the minus sign indicates that the elements of the intersection H∩R are subtracted from the set H) in addition to the robot swept space R for searching for a motion path. As a result, an arc-like path which allows the vertical articulated robot to move in the shortest time is determined as a motion path 1601 as shown in FIG. 15. In other words, the robot 302 can avoid making wasteful motions as in the conventional method by making a motion along the motion path 1601 determined by the motion path search device 100 in Embodiment 1. In other words, the robot 302 can make a motion from the starting point to the end point in a time shorter than in the conventional method. The motion path search device 100 is thus capable of determining a motion path of higher optimality.

As described above, the motion path search device 100 in Embodiment 1 can calculate, as an accessible space for searching for a motion path, a union of a space swept through by the robot 302 and a space swept through by at least a portion of the body of the operator 301 in direct teaching. In other words, a space not swept through by the robot 302 in direct teaching can be additionally included in an accessible space. Since the calculated accessible space is a space expanded from the space swept through by the robot 302, a motion path of higher optimality can be determined. In addition, since an accessible space can be calculated using a space swept through by at least a portion of the body of the operator 301 in direct teaching, the operator 301 is no longer required to repeat trial-and-error teaching only in order to expand an accessible space. Thus, increase in the load on the operator 301 can be also reduced.

Embodiment 2

Embodiment 2 shall be described below with reference to the drawings. The description of the part in common with Embodiment 1 will not be repeated herein.

Figure 16:
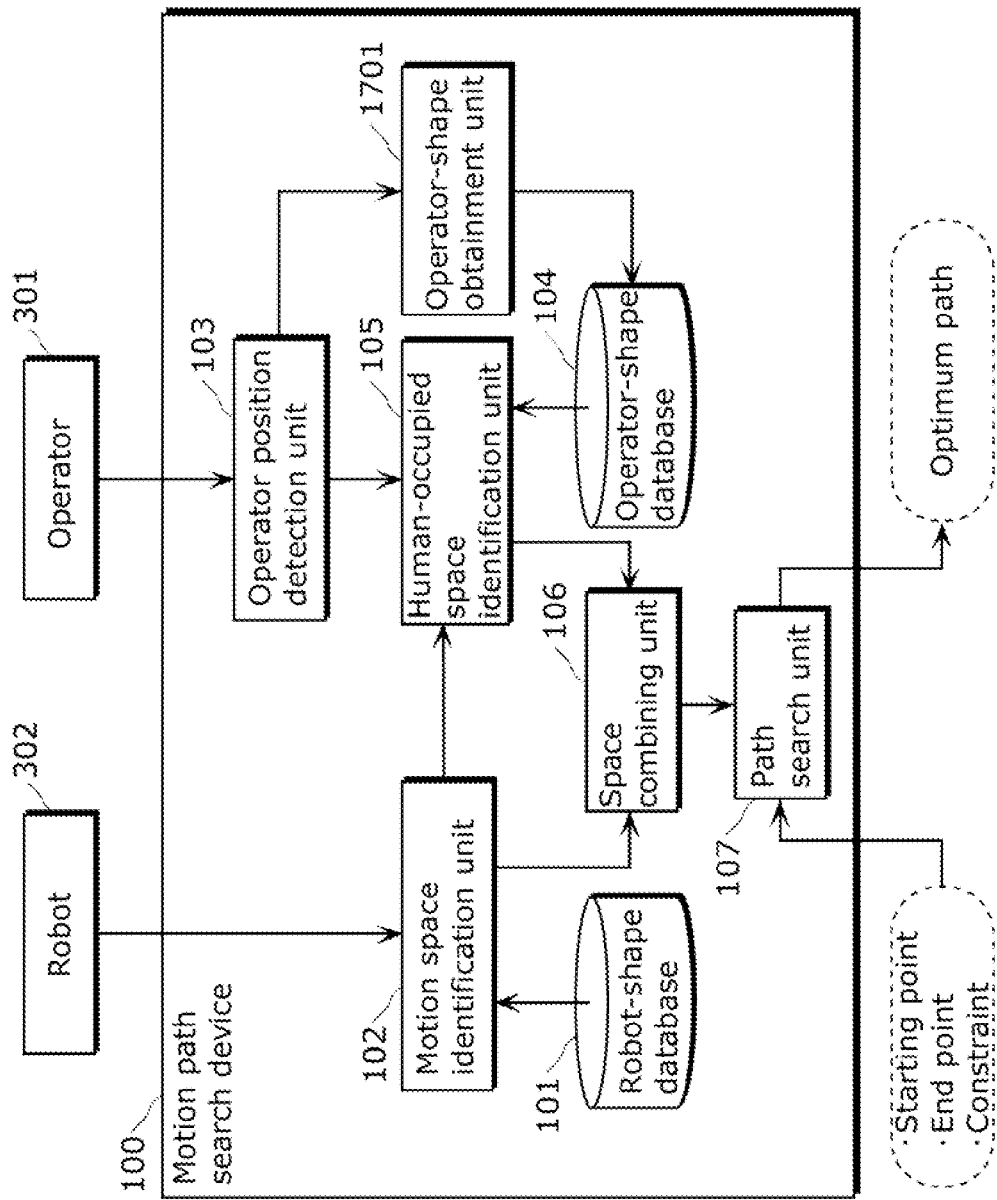
FIG. 16 is a block diagram showing a basic functional configuration of a motion path search device according to Embodiment 2.

FIG. 16 is a block diagram showing a basic functional configuration of the motion path search device 100 in Embodiment 2. As shown in FIG. 16, the motion path search device 100 in Embodiment 2 includes an operator-shape obtainment unit 1701 in addition to the components included in the motion path search device in Embodiment 1.

The operator-shape obtainment unit 1701 changes operator-shape data stored in the operator-shape database 104 according to an input of a position of the operator detected by the operator position detection unit 103.

Figure 17:
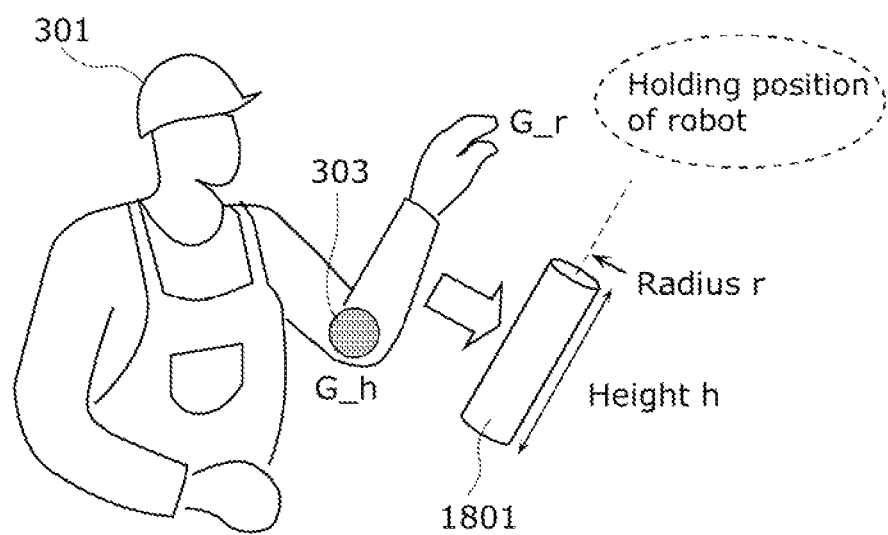
FIG. 17 shows an example of an operator-shape data stored in an operator-shape database in Embodiment 2.

The operator-shape database 104 stores operator-shape data indicating the shape of a forearm of the operator 301. For example, the operator-shape data indicates a cylindrical shape 1801 as shown in FIG. 17. The size of the cylindrical shape 1801 is defined by two numerical parameters (a radius r and a height h).

For example, the radius r has a value previously entered by the operator 301 through an input unit not shown in the drawings. For example, the radius for the shortest circumference of a forearm of the operator 301 obtained by measuring may be determined as the radius r.

The height h is determined by measuring a three-dimensional distance $|G\_h-G\_r|$ between the three-dimensional position $G\_r$ of the handle part 509 and a position $G\_h$ measured using the three-dimensional position measuring device 303 when the operator 301 is grasping the handle part 509 of the robot 302.

In other words, the operator-shape obtainment unit 1701 obtains the height of the cylindrical shape of a three-dimensional model based on the distance between the three-dimensional position of the handle part 509 and the three-dimensional position of the elbow of the operator 301. Specifically, for example, the operator-shape obtainment unit 1701 determines, as the height h, a minimum value (h=min $|G\_h-G\_r|$) of three-dimensional distances $|G\_h-G\_r|$ measured several times before or in direct teaching. Then, the operator-shape obtainment unit 1701 updates the operator-shape data using the determined height h.

As described above, the motion path search device 100 in Embodiment 2 saves the operator 301 from measuring the height h of the three-dimensional model having the shape of the forearm using a measuring tape or the like, and thus allows the operator 301 to immediately start teaching of the robot 302. In addition, the difference between the cylindrical shape indicated by the operator-shape data and the actual shape of the forearm of the operator is small compared to the case where the predetermined height h is used. As a result, the motion path search device 100 in Embodiment 2 can identify a space swept through by the forearm of the operator with higher accuracy.

Embodiment 3

Embodiment 3 shall be described below with reference to the drawings. The description of the part in common with Embodiment 1 will not be repeated herein.

Figure 18:
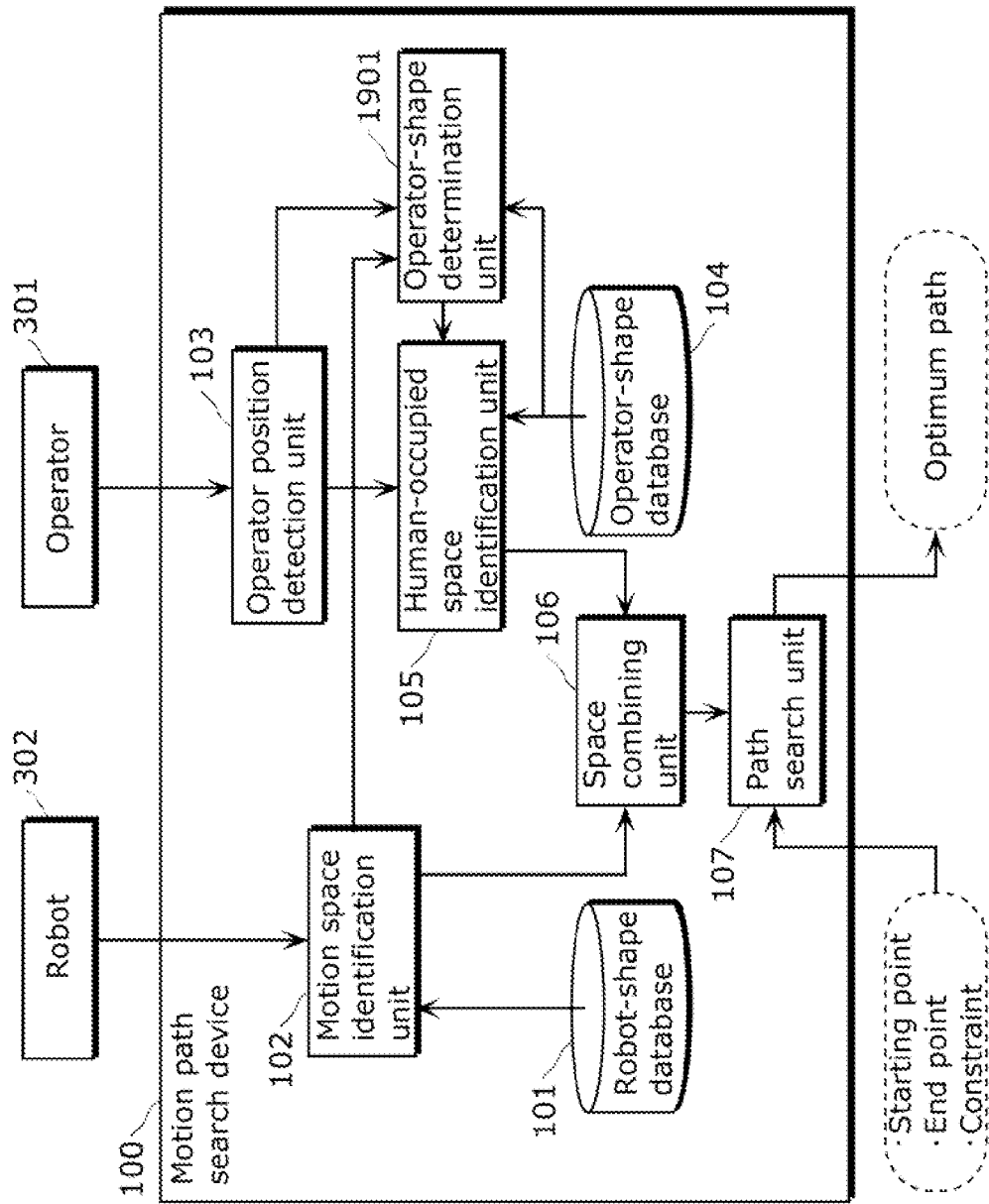
FIG. 18 is a block diagram showing a basic functional configuration of a motion path search device in Embodiment 3.

FIG. 18 is a block diagram showing a basic functional configuration of the motion path search device 100 in Embodiment 3. As shown in FIG. 18, the motion path search device 100 in Embodiment 3 includes an operator-shape determination unit 1901 in addition to the components included in the motion path search device in Embodiment 1.

The operator-shape determination unit 1901 determines whether the operator 301 is teaching an operation to the robot 302 with his or her right arm, the left arm, or both arms, by using, as an input, the position of the operator 301 detected by the operator position detection unit 103, the posture of the robot 302 output by the motion space identification unit 102, and operator-shape data stored in the operator-shape database 104. Then, the operator-shape determination unit 1901 outputs the result of the determination to the human-occupied space identification unit 105.

The human-occupied space identification unit 105 identifies the space occupied by the operator 301 based on the result of the determination received from the operator-shape determination unit 1901.

Figure 19:
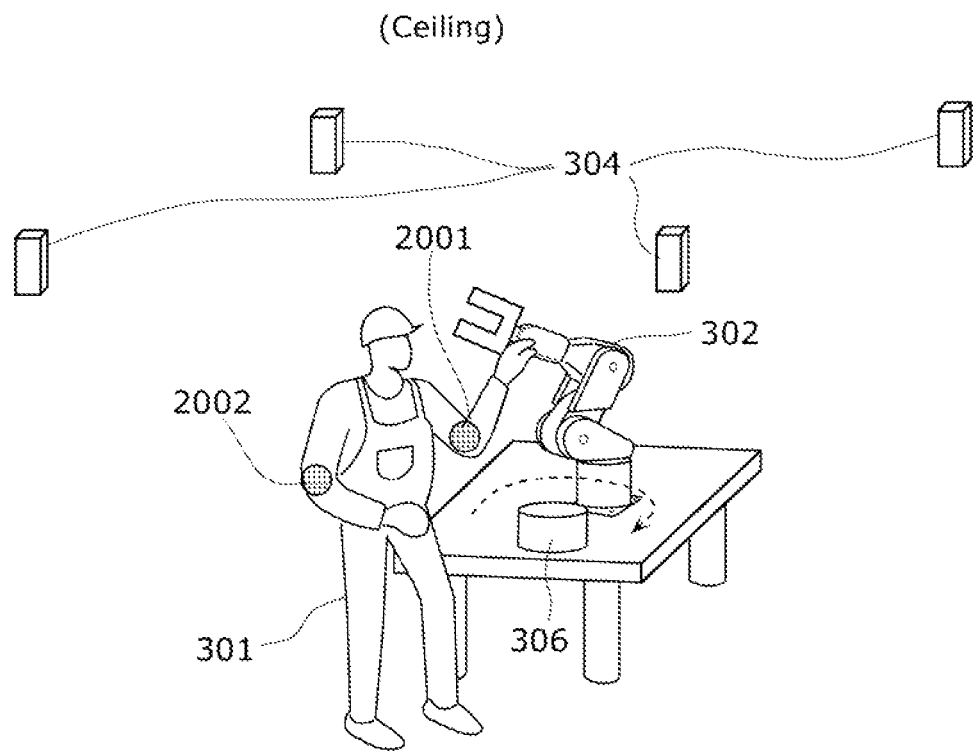
FIG. 19 shows a scene in which the motion path search device is used in Embodiment 3.

As shown in FIG. 19, the operator 301 wears a three-dimensional position measuring device 2001 on the left elbow and a three-dimensional position measuring device 2002 on the right elbow.

Figure 20:
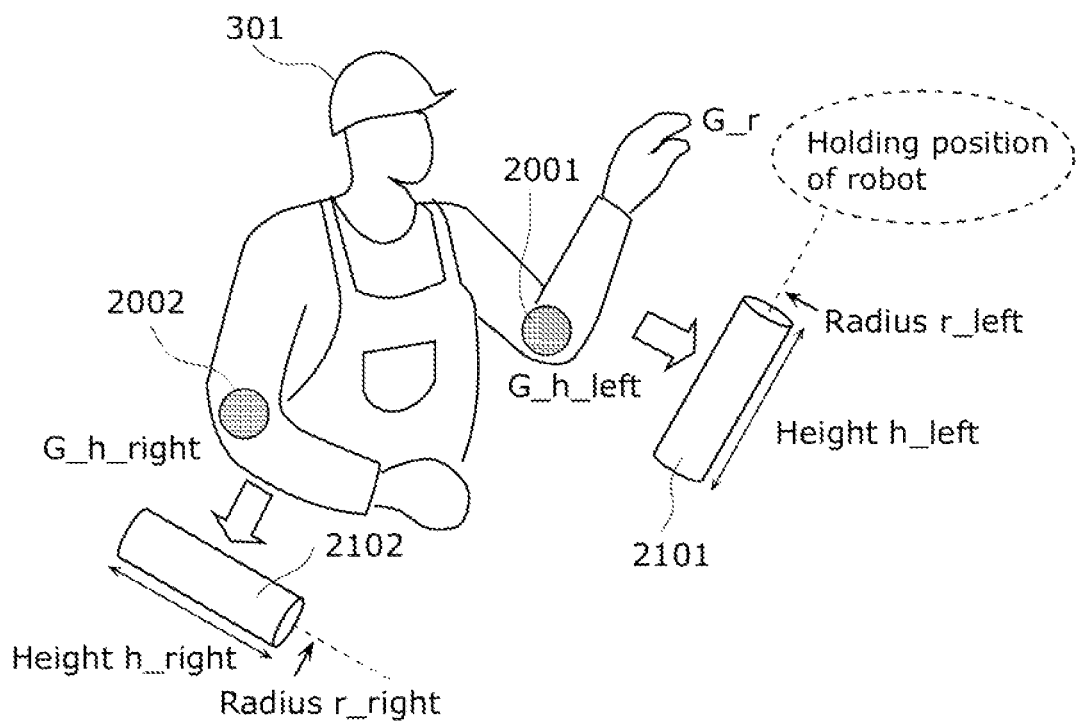
FIG. 20 shows an example of an operator-shape data stored in an operator-shape database in Embodiment 3.

As shown in FIG. 20, the operator-shape database 104 stores operator-shape data (a cylindrical shape 2101) for the left forearm of the operator 301 and operator-shape data (a cylindrical shape 2102) for the right forearm of the operator 301. The size of the cylindrical shape 2101 indicated by the operator-shape data is defined by two numerical parameters (a radius r\_left and a height h\_left). Likewise, the size of the cylindrical shape 2102 indicated by the operator-shape data is defined by two numerical parameters (a radius r\_right and a height h\_right).

For example, the radius\_left and the radius right each has a value previously entered by the operator 301 through an input unit not shown in the drawings. Specifically, for example, the radius r\_left is determined based on the section having the shortest circumference of the left forearm of the operator 301, and the radius r\_right is determined based on the section having the shortest circumference of the right forearm of the operator 301.

The height h\_left and the height h\_right are determined by measuring distances from the position sensing devices 2201 and 2202 to the handle part 509, respectively, when the operator 301 is grasping the handle part 509 of the robot 302.

The operator position detection unit 103 detects the three-dimensional positions G\_h\_left and G\_h\_right of the left and right elbows of the operator 301 using the position sensing device 2201 and the position sensing device 2202 at regular intervals T while the operator 301 is performing direct teaching grasping the handle part 509 of the robot 302 with the left hand, the right hand, or both hands. On the other hand, the motion space identification unit 102 outputs the three-dimensional positions G\_r of the handle part 509 of the robot 302 synchronously with the intervals of the detection of the three-dimensional positions of the elbows.

The operator-shape determination unit 1901 determines the arm which the operator 301 is using for the teaching, by comparing the distances from the three-dimensional positions G\_h\_left and G\_h\_right of the elbows of the operator 301 to the three-dimensional position G\_r of the handle part 509 with the heights h\_left and the h\_right of the left arm and the right arm of the operator 301 indicated by the operator-shape data stored in the operator-shape database 104.

Figure 21:
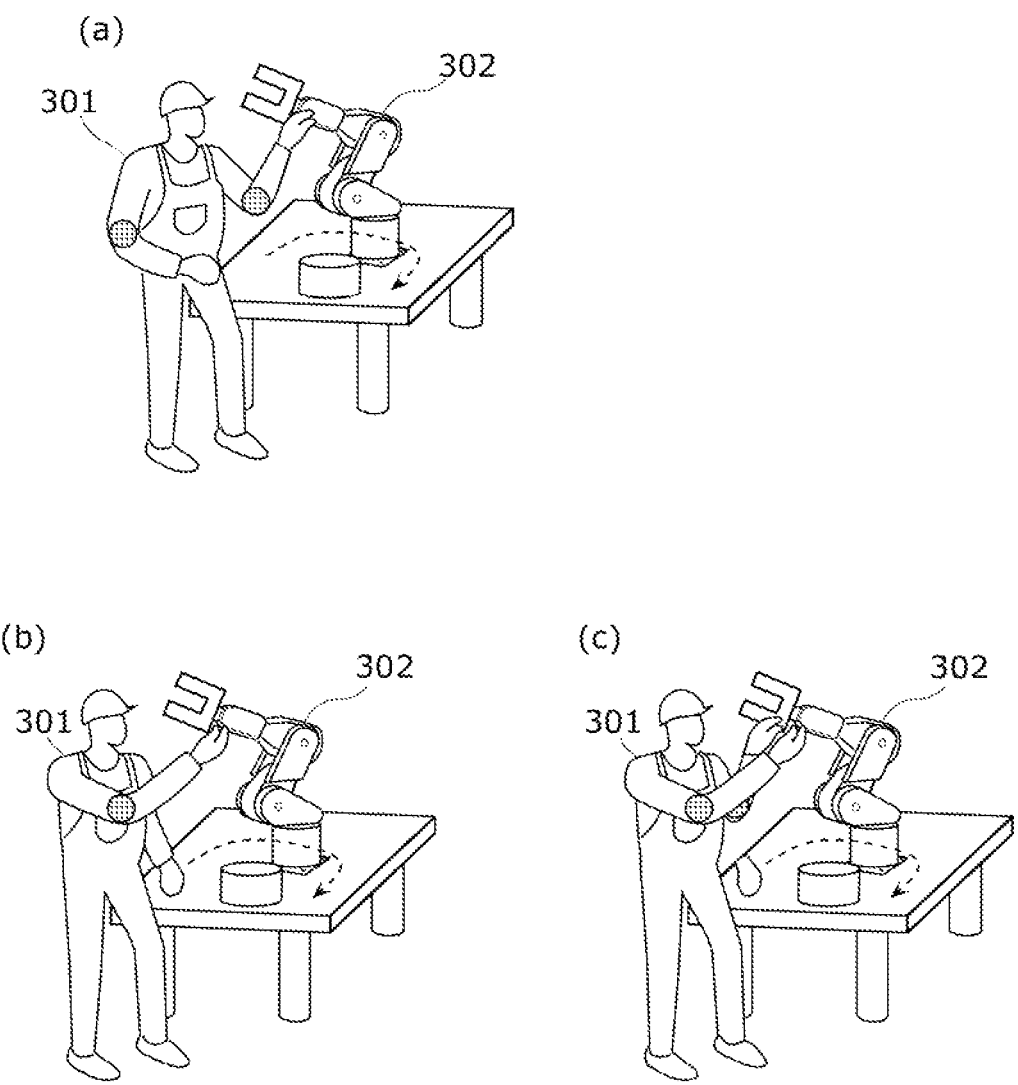
FIG. 21 is a diagram for illustrating a posture of an operator in Embodiment 3.

Specifically, the operator-shape determination unit 1901 determines the left arm as being used by the operator 301 for the teaching ((a) in FIG. 21) when $|G\_h\_left-G\_r|<=h\_left$ is satisfied. The operator-shape determination unit 1901 determines the right arm as being used by the operator 301 for the teaching ((b) in FIG. 21) when $|G\_h\_right-G\_r|<=h\_right$ is satisfied. The operator-shape determination unit 1901 determines both arms as being used by the operator 301 for teaching ((c) in FIG. 21) when $|G\_h\_left-G\_r|<=h\_left$ and $|G\_h\_right-G\_r|<=h\_right$ are satisfied.

The human-occupied space identification unit 105 virtually places one or two three-dimensional models having the shape(s) of the forearm(s) in a three-dimensional space based on the determination by the operator-shape determination unit 1901. Then, the human-occupied space identification unit 105 performs inclusion determination as to whether or not each of the voxels composing the three-dimensional space is located inside the three-dimensional model(s) having the shape(s) of the forearm(s) of the operator 301.

As described above, in the motion path search device 100 in Embodiment 3, the human-occupied space identification unit 105 is capable of identifying space(s) swept through by forearm(s) in use for direct teaching even when the operator 301 is performing direct teaching using either or both of the arms. Furthermore, the motion path search device 100 in Embodiment 3 saves the operator 301 from taking the trouble of informing the motion path search device 100 of the arm to use for direct teaching, and thereby reducing increase in load on the operator 301.

Embodiment 4

Embodiment 4 of the present disclosure shall be described below with reference to the drawings. The description of the part in common with Embodiment 1 will not be repeated herein.

Figure 22:
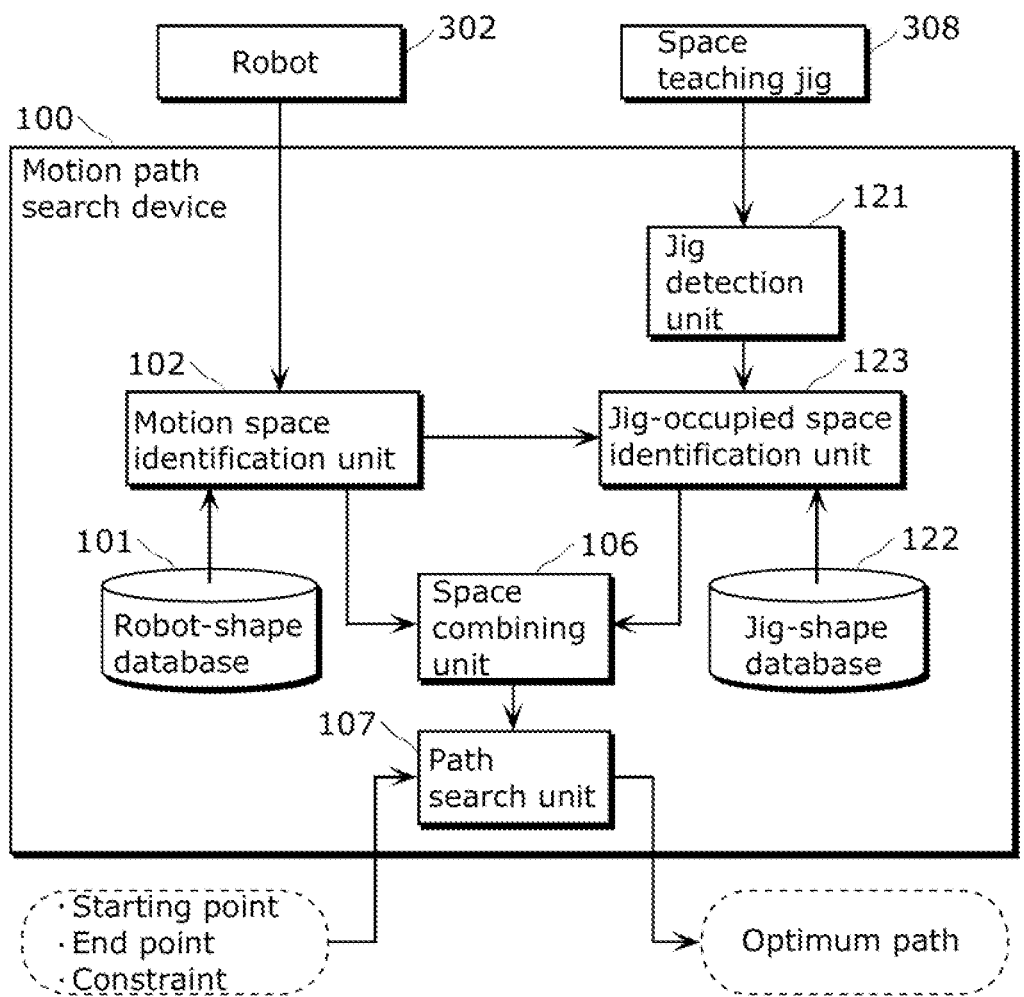
FIG. 22 is a block diagram showing a basic functional configuration of a motion path search device in Embodiment 4.

FIG. 22 is a block diagram showing a basic functional configuration of the motion path search device 100 according to Embodiment 4. As shown in FIG. 22, the motion path search device 100 in Embodiment 4 includes a jig detection unit 121, a jig-shape database 122, and a jig-occupied space identification unit 123 instead of the operator position detection unit 103, the operator-shape database 104, and the human-occupied space identification unit 105.

The jig detection unit 121 detects a part of the robot 302 where a space teaching jig 308 is mounted. Furthermore, the jig detection unit 121 detects an identifier of the space teaching jig 308.

For example, when a part of the robot 302 is provided with a lock mechanism to fasten the space teaching jig 308, the jig detection unit 121 detects whether or not the space teaching jig 308 is mounted on the part provided with the lock mechanism by determining whether or not the lock mechanism is in a locking state.

Furthermore, the jig detection unit 121 detects an identifier of the space teaching jig 308 using a photo-interrupter, for example. Optionally, the jig detection unit 121 may read an identifier from a barcode provided on the space teaching jig 308 using a barcode reader.

The jig-shape database 122 stores shape-data items each in association with an identifier. Each of the shape-data items indicates a shape of a space teaching jig. The identifier is an identifier for identifying a space teaching jig. The shape of the space teaching jig may be a piecewise linear approximation.

The motion path search device 100 need not include the jig detection unit 121. In this case, for example, the operator 301 may manually enter the part where the space teaching jig 308 is mounted and the identifier of the space teaching jig 308 into the motion path search device 100.

The jig-occupied space identification unit 123 corresponds to a second space identification unit. The jig-occupied space identification unit 123 identifies a space swept through by the space teaching jig 308 in direct teaching.

Specifically, the jig-occupied space identification unit 123 identifies a space occupied by the space teaching jig 308 at points of time in direct teaching, based the part of the robot 302 where the space teaching jig 308 is mounted and the jig-shape data stored in the jig-shape database 122. Then, the jig-occupied space identification unit 123 finally identifies a union of the identified spaces as a space swept through by the space teaching jig 308.

The space combining unit 106 calculates, as an accessible space for the robot 302, a union of a space received from the motion space identification unit 102 and a space received from the jig-occupied space identification unit 123.

The path search unit 107 searches for a motion path of the movable part of the robot 302 without the space teaching jig 308 within the accessible space calculated by the space combining unit 106.

Next, the robot 302 and the space teaching jig 308 in Embodiment 4 shall be described below.

Figure 23:
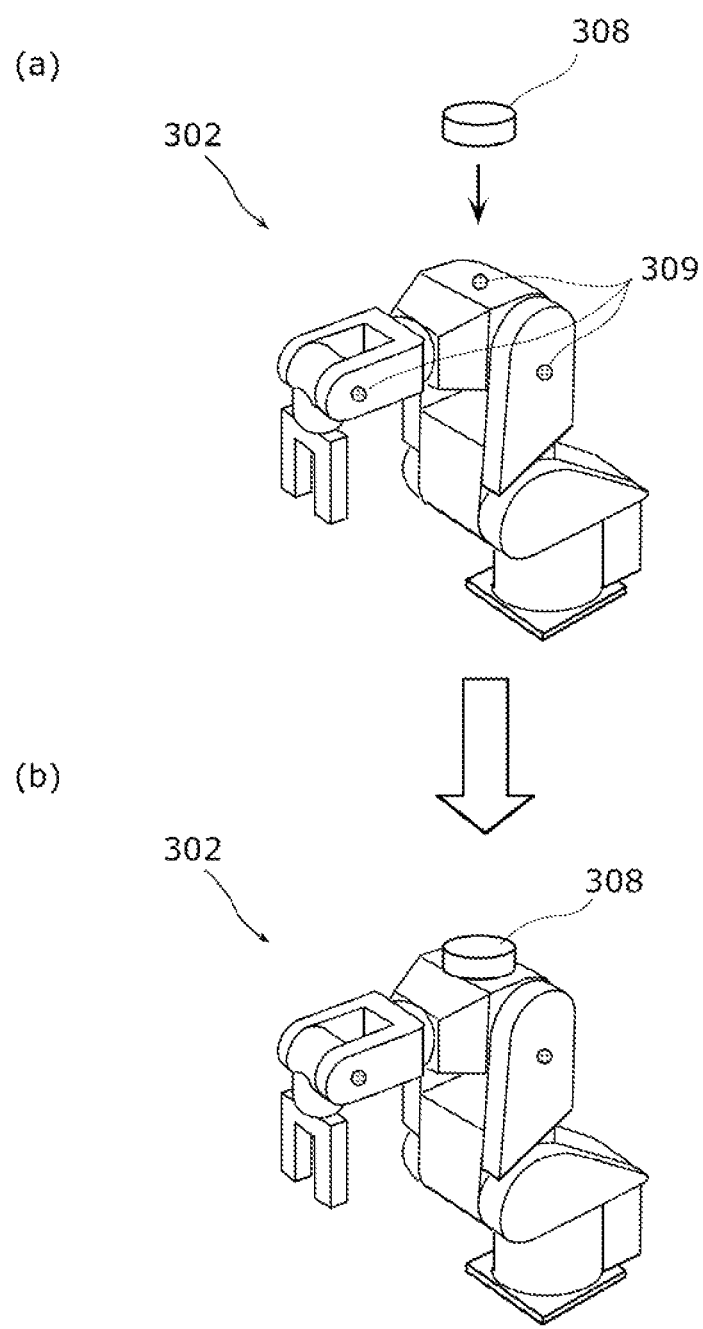
FIG. 23 illustrates an external view of a robot and a space teaching jig in Embodiment 4.

FIG. 23 illustrates an external view of the robot 302 and the space teaching jig 308 in Embodiment 4. Specifically, (a) in FIG. 23 shows the robot 302 before the space teaching jig 308 is mounted thereon. (b) in FIG. 23 shows the robot 302 with the space teaching jig 308 is mounted thereon.

The space teaching jig 308 is a rigid body made of, for example, aluminum or acrylic resin. The space teaching jig 308 is mounted in a predetermined part of the robot 302.

In the example shown in FIG. 23, the robot 302 has lock mechanisms 309 in a plurality of parts thereof (see (a) in FIG. 23). The space teaching jig 308 is mounted in at least one of the parts via the lock mechanisms before direct teaching ((b) in FIG. 23). After direct teaching, the space teaching jig 308 is removed from the robot 302.

In other words, the space teaching jig 308 is a jig mounted on the robot 302 in order to teach an accessible space to the robot 302 in direct teaching. The space teaching jig 308 is therefore removed from the robot 302 after direct teaching.

The space teaching jig 308 need not be mounted in a part of the robot 302 via the lock mechanism. For example, the space teaching jig 308 is mounted in a predetermined part of the robot 302 by magnetic force.

Next, operations of the motion path search device 100 having the above-described configuration shall be described below.

Figure 24:
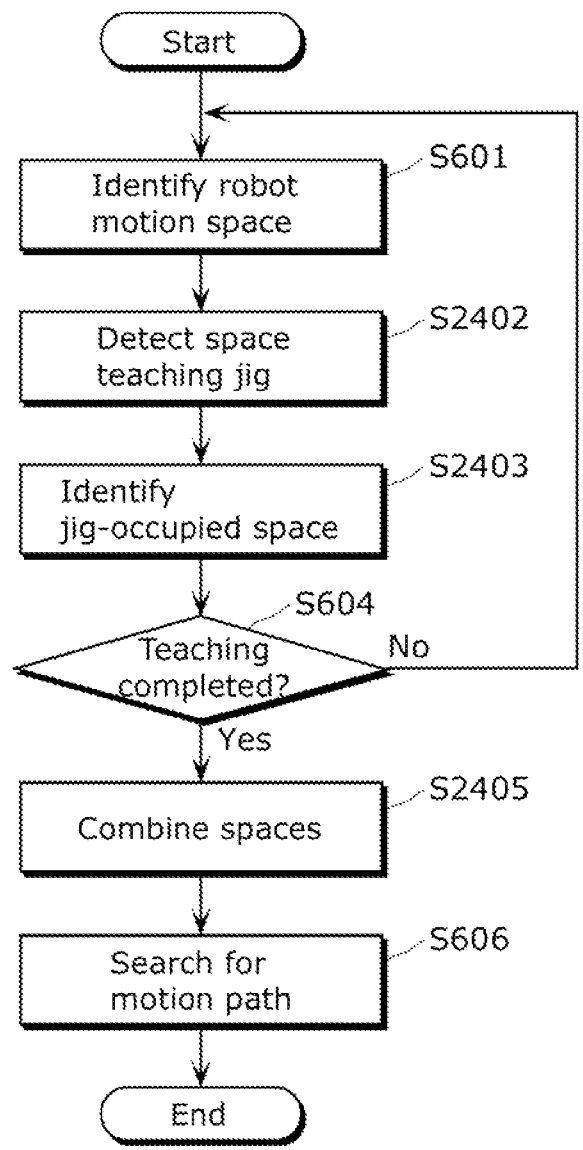
FIG. 24 is a flowchart showing the process of searching for a motion path according to Embodiment 4.

FIG. 24 is a flowchart showing the process of searching for a motion path according to Embodiment 4. The steps in common with FIG. 5 are denoted with the same reference signs in FIG. 24 and the description thereof is not repeated herein. In the direct teaching described below, the operator 301 teaches the robot 302 with the space teaching jig 308 mounted thereon a motion from the starting point 305 to the end point 307, moving around the obstacle 306.

The operator 301 performs direct teaching while grasping the handle part 509 of the robot 302, so that the values (JT1, JT2, JT3, JT4, JT5, JT6) indicating the angles of the rotational axes change whereby the robot 302 changes its posture.

Figure 25:
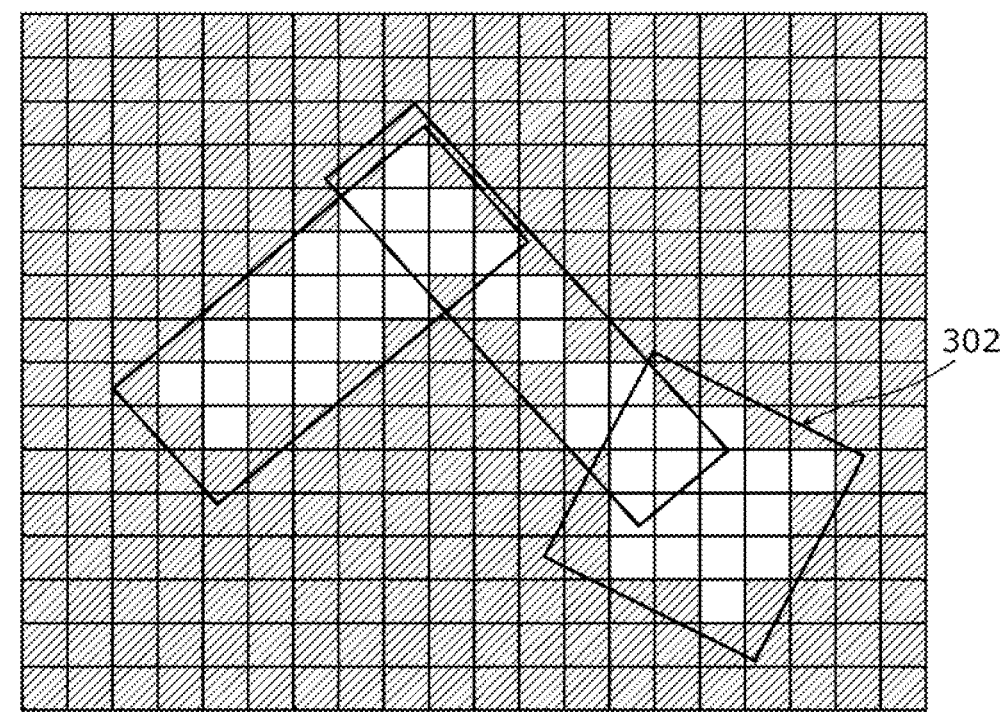
FIG. 25 is a diagram for illustrating inclusion determination by a motion space identification unit in Embodiment 4.

At this time, the motion space identification unit 102 identifies a space occupied by the movable part 508 of the robot 302 (S601). As a result, as shown in FIG. 25, the logical values of voxels 2502 included in the robot 302 are set to true. The logical values of voxels 2501 having any part outside the robot 302 are not changed.

Next, the jig detection unit 121 detects the space teaching jig 308 mounted on the robot 302 (S2402). Specifically, the jig detection unit 121 detects a part where the space teaching jig 308 is mounted and the identifier of the space teaching jig 308.

Next, the jig-occupied space identification unit 123 identifies a space occupied by the space teaching jig 308 (S2403). Specifically, the jig-occupied space identification unit 123 virtually places a three-dimensional model having the shape of the space teaching jig 308 in a three-dimensional space based on the part where the space teaching jig 308 is mounted. Then, the jig-occupied space identification unit 123 identifies a region occupied by the three-dimensional model placed in the three-dimensional space.

More specifically, the jig-occupied space identification unit 123 reads a jig-shape data item corresponding to the identifier detected by the jig detection unit 121 from the jig-shape database 122. Then, the jig-occupied space identification unit 123 virtually places a three-dimensional model having the shape indicated by the read jig-shape data in the three-dimensional space. In other words, the jig-occupied space identification unit 123 virtually places, in the three-dimensional space, a three-dimensional model having the shape indicated by the read jig-shape data in a position calculated from posture information of the robot 302, robot-shape data, and information on the part where the space teaching jig 308 is mounted.

Then, the jig-occupied space identification unit 123 performs inclusion determination as to whether or not each of the voxels composing the three-dimensional space is located inside the three-dimensional model which is in the shape of the space teaching jig 308 and virtually placed in the three-dimensional space. The inclusion determination is a process of determining whether or not all points in a voxel is within a closed region formed by the three-dimensional model representing the shape of the space teaching jig 308 (this is hereinafter described as "a voxel is included in the space teaching jig 308").

The jig-occupied space identification unit 123 determines a voxel included in the space teaching jig 308 as being a voxel accessible to the robot 302, and therefore sets the logical value of the voxel to true. On the other hand, the jig-occupied space identification unit 123 does not change the logical value of a voxel not included in the space teaching jig 308.

As a result, as shown in FIG. 26, the logical values of voxels 2602 included in the space teaching jig 308 are set to true. The logical values of voxels 2601 having any part outside the space teaching jig 308 are not changed.

The set S of the voxels determined as being accessible by the jig-occupied space identification unit 123 can be calculated using Expression (6) below.

$$S = U\{V(x,y,z) | M(x,y,z) = \text{true}\} \quad \text{Expression (6)}$$

The jig-occupied space identification unit 123 identifies the set S of the voxels as a space occupied by the space teaching jig 308.

Next, a determination is made as to whether or not the operator 301 has indicated completion of teaching (S604). The process from Steps S601, S2402, and S2403 is repeated until the operator 301 indicates completion of teaching (No in S604).

In other words, the motion space identification unit 102 continually identifies spaces occupied by the movable part 508 of the robot 302 at points of time in direct teaching and thereby determines a swept space swept through by the movable part 508 of the robot 302. In addition, the jig-occupied space identification unit 123 continually identifies a swept space swept through by the space teaching jig 308 by continually identifying spaces occupied by the space teaching jig 308 at the points of time in direct teaching.

Figure 28:
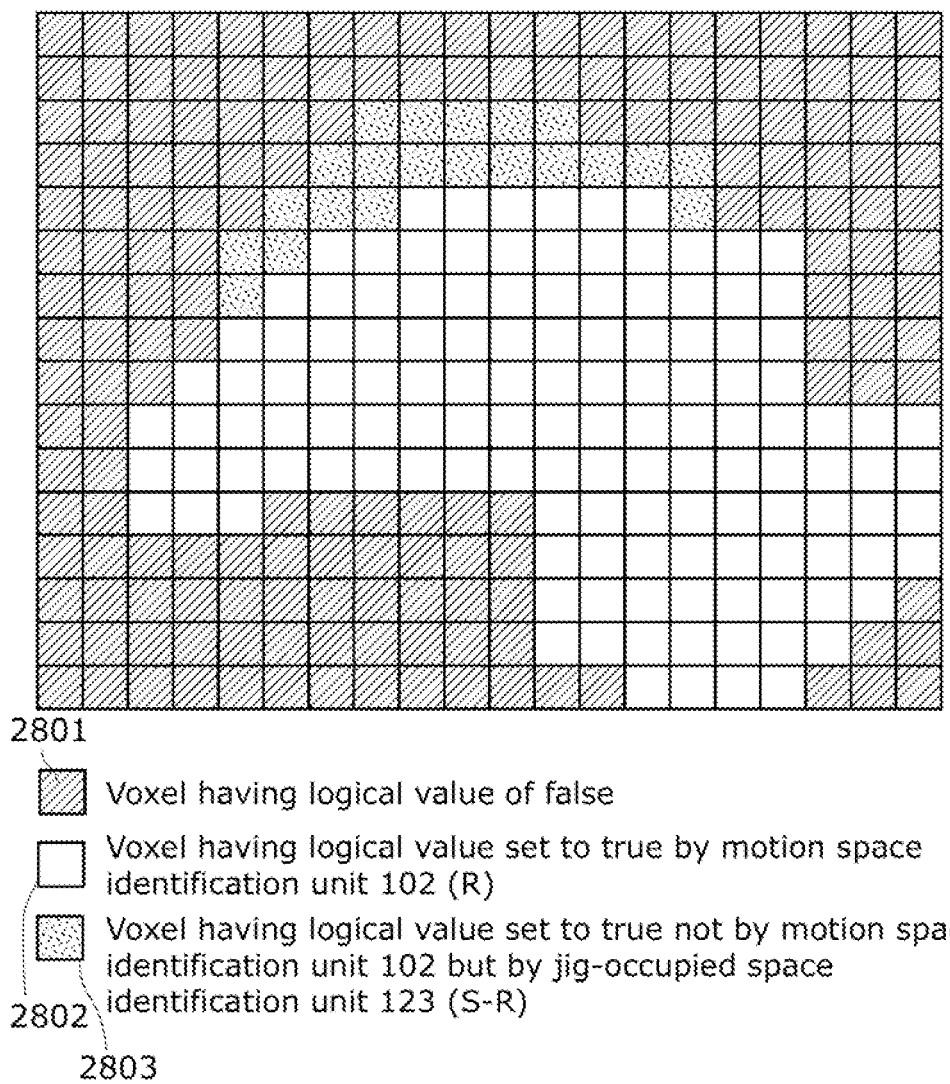
FIG. 28 is a diagram for illustrating an accessible space calculated by the space combining unit in Embodiment 4.

When the operator 301 has indicated completion of teaching (Yes in S604), the space combining unit 106 calculates, as an accessible space for the robot 302, a union R∪S of the set R of the accessible voxels received from the motion space identification unit 102 and the set R of the accessible voxels received from the jig-occupied space identification unit 123 (S2405) as shown in FIG. 28. In other words, the space combining unit 106 calculates, as an accessible space, a union of the space identified by the motion space identification unit 102 and the space identified by the jig-occupied space identification unit 123.

Figure 27:
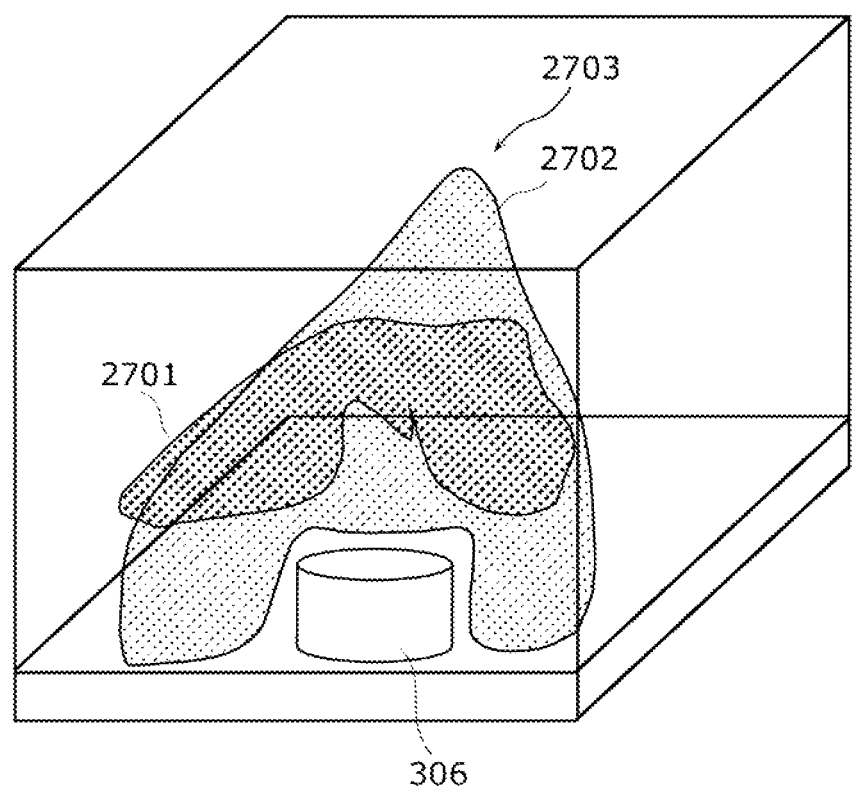
FIG. 27 is a diagram for illustrating an accessible space calculated by the space combining unit in Embodiment 4.

FIG. 27 and FIG. 28 are diagrams for illustrating the accessible space calculated by the space combining unit 106 in Embodiment 4. An accessible space 2703 shown in FIG. 27 corresponds to the union R∪S of the swept space 2701 of the robot 302 and the swept space 2702 of the space teaching jig 308. FIG. 28 shows the union R∪S using a projection thereof on a two-dimensional plane for simplicity. The union R∪S corresponds to the region composed of unpatterned voxels 2802 and dotted voxels 2803. In other words, the union R∪S corresponds to the region composed of voxels other than voxels 2801 with hatched lines.

Lastly the path search unit 107 searches for a motion path of the movable part 508 within the accessible space calculated by the space combining unit 106 (S606). Specifically, the path search unit 107 searches for a motion path using the accessible space calculated by the space combining unit 106 as a search space. As a result, the path search unit 107 can provide a path of higher optimality under given search conditions (the starting point and end point indicating three-dimensional positions and a constraint).

Figure 30:
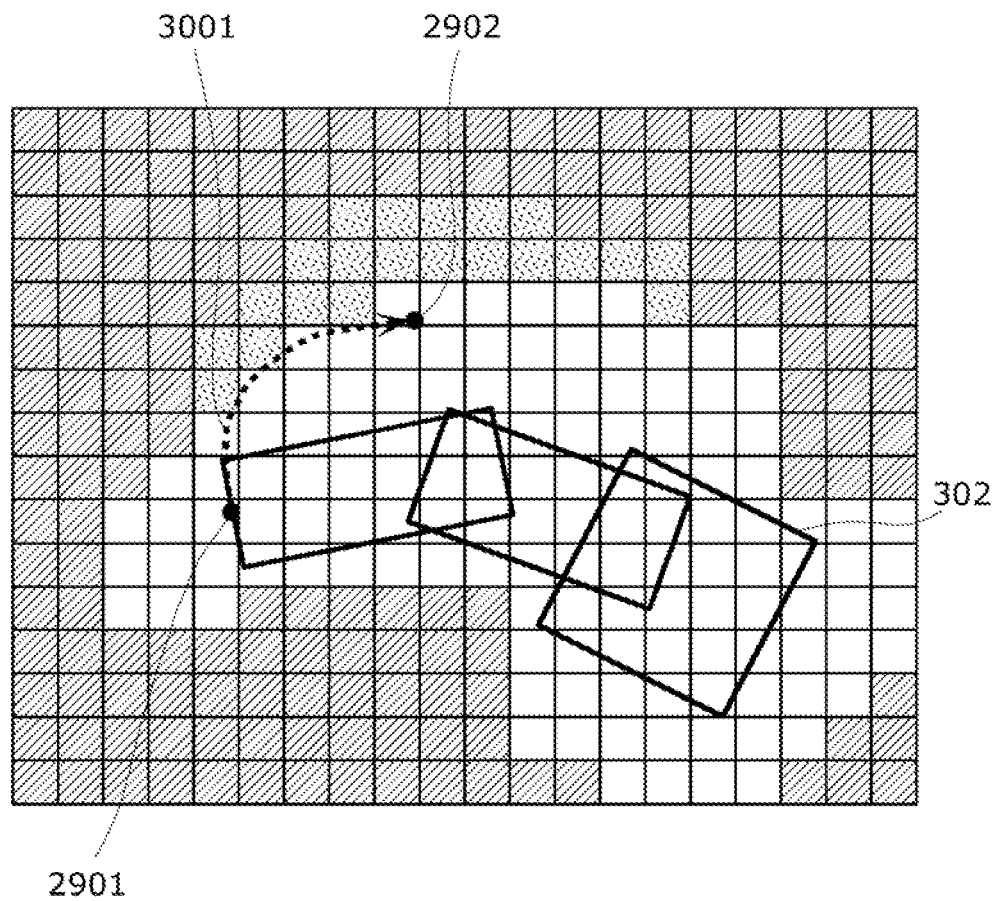
FIG. 30 shows an example of a motion path determined by the motion path search device in Embodiment 4.

The following describes an example of a motion path determined by the path search unit 107 in Embodiment 4 in comparison with a motion path determined using a conventional method, using FIG. 29 to FIG. 30.

FIG. 29 shows an example of a motion path determined using a conventional method. FIG. 30 shows an example of a motion path determined by the motion path search device 200 in Embodiment 4.

In the conventional method, a motion path from a starting point 2901 to an end point 2902 is searched for within a robot swept space R. Accordingly, the motion path 2903 determined as a result of the determination is a complicated, curved path as shown in FIG. 29. In order to move the end of the movable part 508 along the motion path 2903, the entirety of the robot 302 needs to move in a direction 2904 and subsequently rotate. In other words, the motion path 2903 determined using the conventional method causes wasteful motions of the robot 302, thereby resulting in poor optimality.

In contrast, the motion path search device 100 in Embodiment 4 can search for a motion path using the jig swept space S in addition to the robot swept space R as shown in FIG. 30. In other words, the path search unit 107 can use a space including a space S−R (the minus sign indicates that the elements of the intersection S∩R are subtracted from the set S) in addition to the robot swept space R for searching for a motion path.

As a result, an arc-like path which allows the vertical articulated robot to move in the shortest time is determined as a motion path 3001 as shown in FIG. 30. In other words, the robot 302 can avoid making wasteful motions as in the conventional method by making a motion along the motion path 3001 determined by the motion path search device 100 in Embodiment 4. In other words, the robot 302 can make a motion from the starting point to the end point in a time shorter than in the conventional method. The motion path search device 100 is thus capable of determining a motion path of higher optimality.

As described above, the motion path search device 100 according to Embodiment 4 can calculate, as an accessible space for searching for a motion path, a union of a space swept through by the robot 302 and a space swept through by at least the space teaching jig 308 in direct teaching. In other words, a space not swept through by the robot 302 in direct teaching can be included in an accessible space. Since the calculated accessible space is a space expanded from the space swept through by the robot 302, a motion path of higher optimality can be determined. In addition, since an accessible space can be calculated using the space swept through by the space teaching jig 308 in direct teaching, the operator 301 is no longer required to repeat trial-and-error teaching only in order to expand an accessible space. Thus, increase in the load on the operator 301 can be also reduced.

Variation of Embodiment 4

A modification of Embodiment 4 shall be described below.

A motion path search device in the present modification includes a notification unit in addition to the components included in the motion path search device in Embodiment 4. The notification unit notifies that a space teaching jig needs to be removed from the robot.

Figure 31:
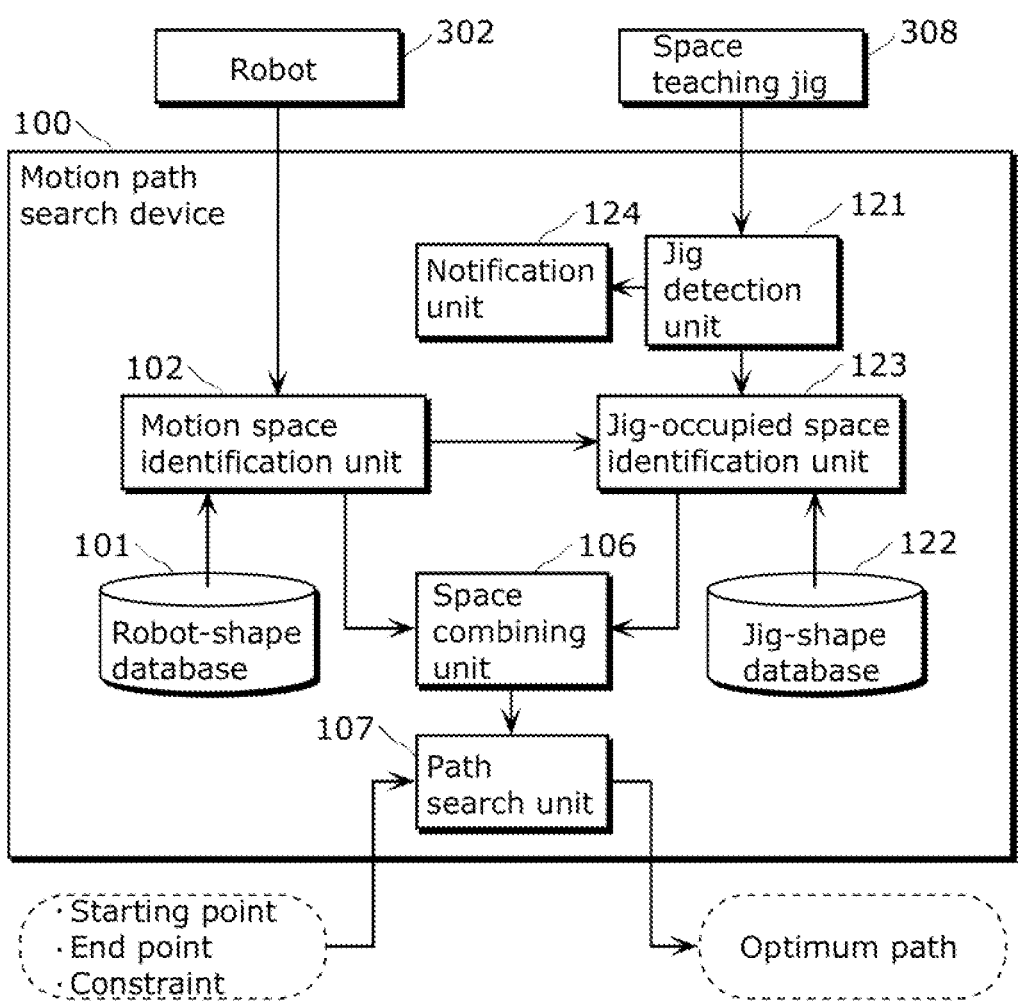
FIG. 31 is a block diagram showing a basic functional configuration of a motion path search device in a modification of Embodiment 4.

FIG. 31 is a block diagram showing a basic functional configuration of the motion path search device 100 in the modification of Embodiment 4. The components in common with FIG. 22 are denoted with the same reference signs in FIG. 31 and the description thereof is not repeated herein.

As shown in FIG. 31, the motion path search device 100 further includes a notification unit 124

The notification unit 124 notifies of an operator or a worker that the space teaching jig 308 needs to be removed from the robot 302, when the space teaching jig 308 remains on the robot 302 after direct teaching is completed.

Specifically, for example, the notification unit 124 illuminates or blinks a light of the robot 302 to notify of an operator or a worker that the space teaching jig 308 needs to be removed from the robot 302. As another example, the notification unit 124 sounds an alarm to notify an operator or a worker that the space teaching jig 308 needs to be removed from the robot 302.

As described above, with the motion path search device 100 in the present modification, an operator or a worker can be notified that the space teaching jig 308 needs to be removed from the robot 302 after direct teaching is completed. This prevents the operator or the worker from starting work using the robot 302 with the space teaching jig 308 mounted thereon, and thus increases safety in the work.

Although only some exemplary embodiments of the motion path search device have been described in detail in the present disclosure, these exemplary embodiments are not intended to limit the present disclosure. Those skilled in the art will readily appreciate that many modifications of the exemplary embodiments or embodiments in which the constituent elements of the exemplary embodiments are combined are possible without materially departing from the novel teachings and advantages described in the present disclosure. All such modifications and embodiments are within the scope of the present disclosure.

For example, the motion path search device 100 may be configured by combining Embodiment 2 and Embodiment 3. In other words, the motion path search device 100 may include both of the operator-shape obtainment unit 1701 and the operator-shape determination unit 1901. With this, the motion path search device 100 can automatically obtain the heights h of the three-dimensional models of the left forearm and the right forearm.

Furthermore, the present disclosure is applicable also to the case where the operator 301 performs direct teaching using a leg instead of the arms as shown in Embodiments 1 to 3. In this case, the human-occupied space identification unit 105 identifies a space swept through by the leg of the operator 301 in direct teaching.

Furthermore, the motion path search device 100 may be configured by combining Embodiment 1 and Embodiment 4. In other words, the motion path search device 100 may include both of the human-occupied space identification unit 105 and the jig-occupied space identification unit 123. In this case, the space combining unit 106 calculates, as an accessible space, a union of a space identified by the motion space identification unit 102, a space identified by the human-occupied space identification unit 105, and a space identified by the jig-occupied space identification unit 123.

In other words, the space combining unit 106 calculates, as an accessible space, a union of a space swept through by the movable part of the robot 302 a space swept through by at least a portion of the body of the operator 301, and a space swept through by the space teaching jig 308. Accordingly, the motion path search device 100 can determine a motion path of further higher optimality using a further expanded accessible space thus obtained.

The motion path search device according to any of Embodiments 1 to 4 of the present disclosure need not include all of the components included in the motion path search device described in the respective exemplary embodiments. For example, the motion path search device may be configured as shown in FIG. 32.

Figure 32:
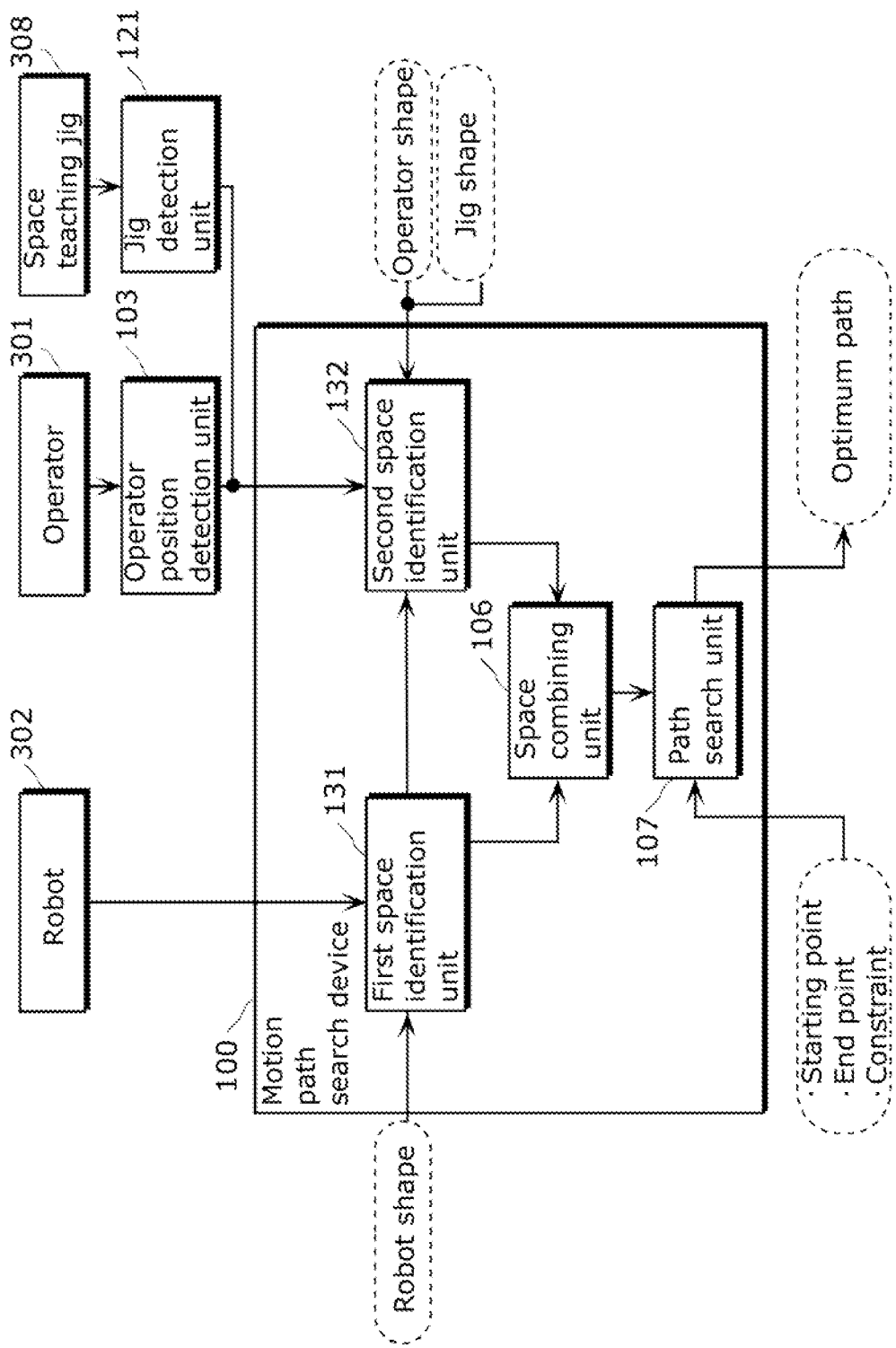
FIG. 32 is a block diagram showing a functional configuration of a motion path search device in an exemplary embodiment of the present disclosure.

FIG. 32 is a block diagram showing a basic functional configuration of the motion path search device 100 according to an aspect of the present disclosure. The motion path search device 100 shown in FIG. 32 includes a first space identification unit 131, a second space identification unit 132, a space combining unit 106, and a path search unit 107.

The first space identification unit 131 corresponds to the first motion space identification unit 102. The second space identification unit 132 corresponds to at least one of the human-occupied space identification unit 105 and the jig-occupied space identification unit 123.

As can be seen in this case, the motion path search device 100 need not include the components such as the robot-shape database 101, the operator position detection unit 103, the operator-shape database 104, the jig detection unit 121, or the jig-shape database 122. In the case shown in FIG. 32, the motion path search device 100 may obtain a three-dimensional position of at least a portion of the body of the operator 301 in direct teaching, robot-shape data, and operator-shape data via, for example, a communication unit or an input unit not shown in the drawings. Optionally, for example, the motion path search device 100 may obtain a part where the space teaching jig 308 is mounted in direct teaching and jig-shape data via such a communication unit or an input unit.

Figure 33:
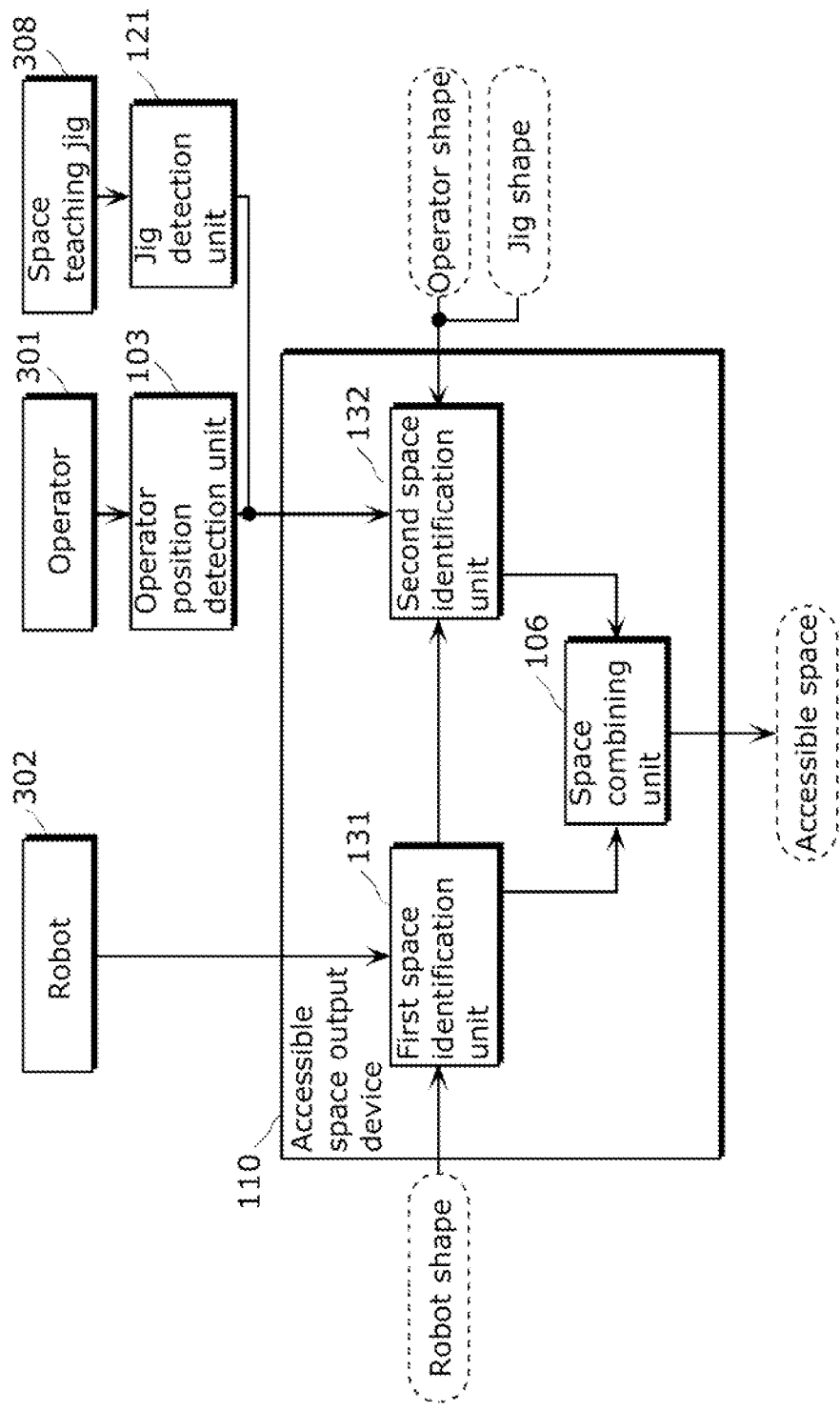
FIG. 33 is a block diagram showing a functional configuration of an accessible space output device in an exemplary embodiment of the present disclosure.
Figure 34:
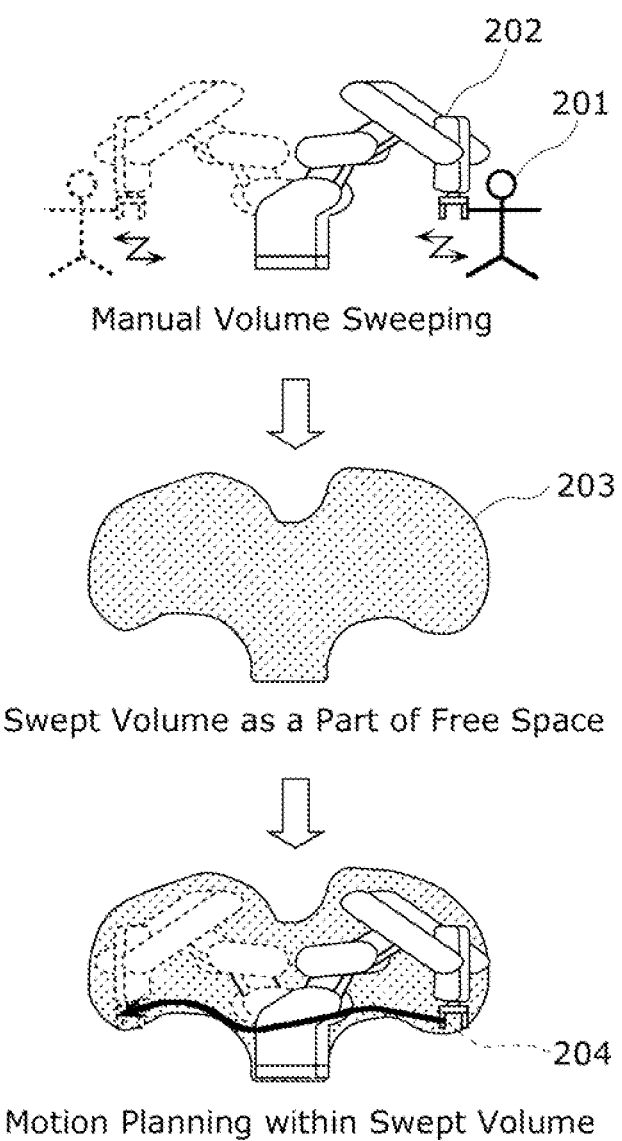
FIG. 34 schematically shows conventional processing for obtaining an accessible space and processing for searching for an optimum path.

Furthermore, another possible embodiment of the present disclosure is an accessible space output device 110. FIG. 33 is a block diagram showing a basic functional configuration of the accessible space output device 110 according to an exemplary embodiment of the present disclosure. As shown in FIG. 33, the accessible space output device 110 includes a first space identification unit 131, a second space identification unit 132, and a space combining unit 106. In this case, the space combining unit 106 outputs a calculated accessible space to, for example, a display device. Then, the accessible space output device 110 shows the accessible space to the operator 301. Optionally, the space combining unit 106 may output a calculated accessible space to a motion path search device. This allows the motion path search device to search for an optimum motion path even when the motion path search device is not capable of calculating an accessible space using a space swept through by the body of an operator.

Furthermore, all or part of the constituent elements of the motion path search devices in the exemplary embodiments may be composed of a single system large scale integration (LSI). For example, the motion path search device 100 may be composed of a system LSI including the first space identification unit 131, the second space identification unit 132, the space combining unit 106, and the path search unit 107.

The system LSI is a super-multifunctional LSI in which constituent units are integrated on a single chip, and specifically is a computer system including a microprocessor, a read-only memory (ROM), and a random-access memory (RAM). The RAM stores a computer program. The microprocessor operates according to the computer program so that the system LSI can perform its function.

The integrated circuit described as a system LSI may be referred to as an IC, an LSI, a super LSI, or an ultra LSI depending on the degree of integration. The method of forming integrated circuitry is not limited to use of an LSI. Dedicated circuitry or a general-purpose processor may be used instead of an LSI. Also applicable is a field programmable gate array (FPGA), which allows post-manufacture programming, or a reconfigurable processor LSI, which allows post-manufacture reconfiguration of connection and setting of circuit cells therein.

Furthermore, in the event that an advance in or derivation from semiconductor technology brings about an integrated circuitry technology whereby an LSI is replaced, functional blocks may be obviously integrated using such new technology. Application of biotechnology or the like is possible.

Furthermore, another possible embodiment of the present disclosure is a method of searching for a motion path including the characteristic processing units in the motion path search device as a stepwise process. Furthermore, another possible embodiment of the present disclosure is a computer program which causes a computer to execute the characteristic stepwise process of the method of searching for a motion path. Such a computer program can be distributed via a non-transitory computer-readable recording medium such as a compact disc read-only memory (CD-ROM) or a communication network such as the Internet.

In the exemplary embodiments, each of the constituent elements may be implemented as a piece of dedicated hardware or implemented by executing a software program appropriate for the constituent element. The constituent elements may be implemented by a program execution unit such as a CPU or a processor which reads and executes a software program recorded on a recording medium such as a hard disk or a semiconductor memory. The motion path search devices in the above-described embodiments are implemented by executing a software program below.

The program causes a computer to perform a method of searching for a motion path of a movable part of a robot capable of being taught by direct teaching in which the robot is directly moved by an operator.

For example, the program causes a computer to execute: identifying a space swept through by the movable part of the robot in the direct teaching; identifying a space swept through by at least a portion of a body of the operator in the direct teaching; calculating, as an accessible space, a union of the space identified as being swept through by the movable part and the space identified as being swept through by the at least a portion of the body of the operator; and searching for a motion path of the movable part within the accessible space calculated in the calculating, wherein in the identifying of a space swept through by the at least a portion of a body of the operator, the space swept through by the at least a portion of the body of the operator is identified by virtually placing a three-dimensional model in a three-dimensional space based on a three-dimensional position of the at least a portion of the body of the operator, and identifying a region occupied by the three-dimensional model in the three-dimensional space, the three-dimensional model having a shape of the at least a portion of the body of the operator.

Furthermore, for example, the program causes a computer to execute: identifying a space swept through by the movable part of the robot in the direct teaching; identifying a space swept through by a space teaching jig in the direct teaching, the space teaching jig being mounted on the robot; calculating, as an accessible space, a union of the space identified as being swept through by the movable part and the space identified as being swept through by the at least a portion of the body of the operator; and searching for a motion path of the movable part of the robot within the accessible space calculated in the calculating, wherein in the identifying of a space swept through by the at least a portion of a body of the operator, the space swept through by the space teaching jig is identified by virtually placing a three-dimensional model having a shape of the space teaching jig in a three-dimensional space based on a part of the robot where the space teaching jig is mounted, and identifying a region occupied by the three-dimensional model in the three-dimensional space, and the program further causes a computer to execute detecting the part of the robot where the space teaching jig is mounted, and in the identifying of a space swept through by the at least a portion of a body of the operator, the three-dimensional model is virtually placed in the three-dimensional space based on the part detected in the detecting.

INDUSTRIAL APPLICABILITY

One or more exemplary embodiments of the present disclosure are applicable to an application for a robot which autonomously searches for a motion path and operates after teaching.

The invention claimed is:

1. A motion path search device which searches for a motion path of a movable part of a robot capable of being taught a motion by direct teaching in which the robot is directly moved by an operator, said motion path search device comprising:
   a first space identification circuit configured to identify a space swept through by the movable part of the robot in the direct teaching;
   a second space identification circuit configured to identify a space swept through by at least a portion of a body of the operator in the direct teaching;
   a space combining circuit configured to calculate, as an accessible space, a union of the space identified by said first space identification circuit and the space identified by said second space identification circuit; and
   a path search circuit configured to search for a motion path of the movable part within the accessible space calculated by said space combining circuit,
   wherein said second space identification circuit is configured to identify the space swept through by the at least a portion of the body of the operator, by virtually placing a three-dimensional model in a three-dimensional space based on a three-dimensional position of the at least a portion of the body of the operator, and identifying a region occupied by the three-dimensional model in the three-dimensional space, the three-dimensional model having a shape of the at least a portion of the body of the operator,
   wherein the robot has a handle part which the operator grasps in the direct teaching, and
   said second space identification circuit is configured to identify the space swept through by the at least a portion of the body of the operator, by virtually placing the three-dimensional model in the three-dimensional space based on at least one of three-dimensional positions of an elbow, a shoulder, and a wrist of the operator and a three-dimensional position of the handle part, and identifying a region occupied by the three-dimensional model in the three-dimensional space, the three-dimensional model having a shape of a forearm or a shape of an entire arm of the operator.

2. The motion path search device according to claim 1, wherein the three-dimensional model has a cylindrical shape.

3. The motion path search device according to claim 2, further comprising an operator-shape obtainment circuit configured to obtain a height of the cylindrical shape of the three-dimensional model based on a distance between the three-dimensional position of the handle part and the three-dimensional position of the elbow of the operator, wherein said second space identification circuit is configured to virtually place, in the three-dimensional space, the three-dimensional model having the cylindrical shape and the height obtained by said operator-shape obtainment circuit.

4. The motion path search device according to claim 1, further comprising an operator-shape determination circuit configured to determine a forearm being used by the operator for the direct teaching, by comparing a distance between a three-dimensional position of a left elbow of the operator and the three-dimensional position of the handle part with a predetermined threshold and comparing a distance between a three-dimensional position of a right elbow of the operator and the three-dimensional position of the handle part with a predetermined threshold, wherein said second space identification circuit is configured to identify a space swept through by the forearm which said operator-shape determination circuit determines as being used.

5. A motion path search device which searches for a motion path of a movable part of a robot capable of being taught a motion by direct teaching in which the robot is directly moved by an operator, said motion path search device comprising:

a first space identification circuit configured to identify a space swept through by the movable part of the robot in the direct teaching;

a second space identification circuit configured to identify a space swept through by at least a portion of a body of the operator in the direct teaching;

a space combining circuit configured to calculate, as an accessible space, a union of the space identified by said first space identification circuit and the space identified by said second space identification circuit; and a path search circuit configured to search for a motion path of the movable part within the accessible space calculated by said space combining circuit;

wherein said second space identification circuit is configured to identify the space swept through by the at least a portion of the body of the operator, by virtually placing a three-dimensional model in a three-dimensional space based on a three-dimensional position of the at least a portion of the body of the operator, and identifying a region occupied by the three-dimensional model in the three-dimensional space, the three-dimensional model having a shape of the at least a portion of the body of the operator, wherein the motion path search device further comprises an operator-shape database storing shape data indicating a shape of the at least a portion of the body of the operator, and wherein said second space identification circuit is configured to virtually place, in the three-dimensional space, the three-dimensional model having the shape indicated by the shape data stored in said operator-shape database.

6. A motion path search device which searches for a motion path of a movable part of a robot capable of being taught a motion by direct teaching in which the robot is directly moved by an operator, said motion path search device comprising:

a first space identification circuit configured to identify a space swept through by the movable part of the robot in the direct teaching;

a second space identification circuit configured to identify a space swept through by at least a portion of a body of the operator in the direct teaching;

a space combining circuit configured to calculate, as an accessible space, a union of the space identified by said first space identification circuit and the space identified by said second space identification circuit; and a path search circuit configured to search for a motion path of the movable part within the accessible space calculated by said space combining circuit, wherein said second space identification circuit is configured to identify the space swept through by the at least a portion of the body of the operator, by virtually placing a three-dimensional model in a three-dimensional space based on a three-dimensional position of the at least a portion of the body of the operator, and identifying a region occupied by the three-dimensional model in the three-dimensional space, the three-dimensional model having a shape of the at least a portion of the body of the operator, wherein the motion path search device further comprises an operator position detection circuit configured to detect the three-dimensional position of the at least a portion of the body of the operator, and wherein said second space identification circuit is configured to virtually place the three-dimensional model in a three-dimensional space based on the three-dimensional position detected by said operator position detection circuit.

7. A method of searching for a motion path of a movable part of a robot capable of being taught a motion by direct teaching in which the robot is directly moved by an operator, said method comprising:

identifying a space swept through by the movable part of the robot in the direct teaching;

identifying a space swept through by at least a portion of a body of the operator in the direct teaching;

calculating, as an accessible space, a union of the space identified as being swept through by the movable part and the space identified as being swept through by the at least a portion of the body of the operator, said calculating being performed using a processor; and searching for a motion path of the movable part within the accessible space calculated in said calculating, wherein in said identifying of a space swept through by the at least a portion of a body of the operator, the space swept through by the at least a portion of the body of the operator is identified by virtually placing a three-dimensional model in a three-dimensional space based on a three-dimensional position of the at least a portion of the body of the operator, and identifying a region occupied by the three-dimensional model in the three-dimensional space, the three-dimensional model having a shape of the at least a portion of the body of the operator, wherein the robot has a handle part which the operator grasps in the direct teaching, and wherein in said identifying of the space swept through by the at least a portion of the body of the operator, the space swept through by the at least a portion of the body of the operator is identified by virtually placing the three-dimensional model in the three-dimensional space based on at least one of three-dimensional positions of an elbow, a shoulder, and a wrist of the operator and a three-dimensional position of the handle part, and identifying a region occupied by the three-dimensional model in the three-dimensional space, the three-dimensional model having a shape of a forearm or a shape of an entire arm of the operator.

8. A non-transitory computer-readable recording medium for use in a computer,
said recording medium having a computer program recorded thereon for causing the computer to execute the method of searching for a motion path according to claim 7.

\* \* \* \* \*